US011094165B2

(12) United States Patent
Singer et al.

(10) Patent No.: US 11,094,165 B2

(45) **Date of Patent: *Aug. 17, 2021**

(54) GAMING SYSTEM, GAMING DEVICE, AND METHOD PROVIDING ONE OR MORE ALTERNATIVE WAGER PROPOSITIONS IF A CREDIT BALANCE IS LESS THAN A DESIGNATED WAGER AMOUNT

(71) Applicant: IGT, Las Vegas, NV (US)

(72) Inventors: Adam M. Singer, Las Vegas, NV (US); Mark C. Nicely, Daly City, CA (US)

(73) Assignee: IGT, Las Vegas, NV (US)

( * ) Notice: Subject to any disclaimer, the term of this patent is extended or adjusted under 35 U.S.C. 154(b) by 25 days.

This patent is subject to a terminal disclaimer.

(21) Appl. No.: 16/559,984

(22) Filed: Sep. 4, 2019

(65) Prior Publication Data

US 2019/0392670 A1 Dec. 26, 2019

Related U.S. Application Data

(63) Continuation of application No. 15/876,799, filed on Jan. 22, 2018, now Pat. No. 10,417,864, which is a (Continued)

(51) Int. Cl.

| | |
|---|---|
| ***A63F 13/00*** | (2014.01) |
| ***A63F 9/24*** | (2006.01) |

(Continued)

(52) U.S. Cl.

CPC ........ *G07F 17/323* (2013.01); *G07F 17/3209* (2013.01); *G07F 17/3211* (2013.01);

(Continued)

(58) Field of Classification Search

CPC ............. G07F 17/3244; G07F 17/3255; G07F 17/3267

See application file for complete search history.

(56) References Cited

U.S. PATENT DOCUMENTS

| | | | |
|---|---|---|---|
| 5,505,461 | A | 4/1996 | Bell et al. |
| 5,531,448 | A | 7/1996 | Moody |

(Continued)

FOREIGN PATENT DOCUMENTS

| | | | |
|---|---|---|---|
| GB | 2101380 | A | 1/1983 |
| WO | 0221369 | A1 | 3/2002 |

OTHER PUBLICATIONS

"CDS to "Give 'Em What They Want" Unveiling Its New Tokenizer Technology at WGCE", The Free Library, available at http://www.thefreelibrary.com/CDS+to+%60%60Give+%60Em+What+They+Want+Unveiling+Its+New+Tokenizer...-a066181681 (4 pages), Oct. 18, 2000.

(Continued)

*Primary Examiner* — Lawrence S Galka

(74) *Attorney, Agent, or Firm* — Neal, Gerber & Eisenberg LLP

(57) ABSTRACT

Various embodiments of gaming systems, gaming devices, and methods of the present disclosure provide one or more alternative wagering propositions to a player when the player's credit balance is less than (or, in certain embodiments, less than or equal to) a designated wager amount. If the player accepts one of the alternative wager propositions, the player risks an amount of the player's remaining credit balance for a chance to win an alternative award. If the player wins the alternative award, the gaming system enables the player to play one or more plays of the wagering game at the designated wager amount. If the player does not win the alternative award, the gaming system reduces the player's credit balance by the amount risked.

9 Claims, 16 Drawing Sheets

Related U.S. Application Data continuation of application No. 15/287,298, filed on Oct. 6, 2016, now Pat. No. 9,881,450, which is a continuation of application No. 14/335,218, filed on Jul. 18, 2014, now Pat. No. 9,466,174, which is a continuation of application No. 13/369,089, filed on Feb. 8, 2012, now Pat. No. 8,801,519.

(51) Int. Cl.
*G07F 17/32* (2006.01)
*G07F 17/34* (2006.01)

(52) U.S. Cl.
CPC ...... *G07F 17/3244* (2013.01); *G07F 17/3255* (2013.01); *G07F 17/3262* (2013.01); *G07F 17/3267* (2013.01); *G07F 17/34* (2013.01)

(56) References Cited

U.S. PATENT DOCUMENTS

| | | | |
|---|---|---|---|
| 5,620,182 | A | 4/1997 | Rossides |
| 5,630,753 | A | 5/1997 | Fuchs |
| 5,732,950 | A | 3/1998 | Moody |
| 5,823,873 | A | 10/1998 | Moody |
| 5,947,821 | A | 9/1999 | Stone |
| 5,954,335 | A | 9/1999 | Moody |
| 5,967,896 | A | 10/1999 | Jorasch et al. |
| 5,976,016 | A | 11/1999 | Moody et al. |
| 6,007,066 | A | 12/1999 | Moody |
| 6,014,594 | A | 1/2000 | Heidel et al. |
| 6,098,985 | A | 8/2000 | Moody |
| 6,120,378 | A | 9/2000 | Moody et al. |
| 6,126,541 | A | 10/2000 | Fuchs |
| 6,173,955 | B1 | 1/2001 | Perrie et al. |
| 6,253,119 | B1 | 6/2001 | Dabrowski |
| 6,264,556 | B1 | 7/2001 | Izawa et al. |
| 6,308,953 | B1 | 10/2001 | Nagano |
| 6,311,978 | B1 | 11/2001 | Moody |
| 6,312,333 | B1 | 11/2001 | Acres |
| 6,375,187 | B1 | 4/2002 | Baerlocher |
| 6,379,248 | B1 | 4/2002 | Jorasch et al. |
| 6,454,651 | B1 | 9/2002 | Yoseloff |
| 6,494,785 | B1 | 12/2002 | Gerrard et al. |
| 6,506,118 | B1 | 1/2003 | Baerlocher et al. |
| 6,514,141 | B1 | 2/2003 | Kaminkow et al. |
| 6,517,074 | B1 | 2/2003 | Moody et al. |
| 6,561,898 | B2 | 5/2003 | Moody |
| 6,568,680 | B1 | 5/2003 | Moody et al. |
| 6,569,015 | B1 | 5/2003 | Baerlocher et al. |
| 6,599,192 | B1 | 7/2003 | Baerlocher et al. |
| 6,632,141 | B2 | 10/2003 | Webb et al. |
| 6,648,754 | B2 | 11/2003 | Baerlocher et al. |
| 6,652,377 | B1 | 11/2003 | Moody |
| 6,692,355 | B2 | 2/2004 | Baerlocher et al. |
| 6,719,632 | B2 | 4/2004 | Palmer et al. |
| 6,722,981 | B2 | 4/2004 | Kaminkow et al. |
| 6,722,982 | B2 | 4/2004 | Kaminkow et al. |
| 6,758,750 | B2 | 7/2004 | Baerlocher et al. |
| 6,786,820 | B2 | 9/2004 | Gerrard et al. |
| 6,790,141 | B2 | 9/2004 | Muir |
| 6,793,579 | B2 | 9/2004 | Baerlocher et al. |
| 6,796,905 | B2 | 9/2004 | Baerlocher et al. |
| 6,808,452 | B2 | 10/2004 | Baerlocher et al. |
| 6,808,454 | B2 | 10/2004 | Gerrard et al. |
| 6,811,483 | B1 | 11/2004 | Webb et al. |
| 6,848,995 | B1 | 2/2005 | Walker et al. |
| 6,852,030 | B2 | 2/2005 | Baerlocher et al. |
| 6,857,961 | B2 | 2/2005 | Soltys et al. |
| 6,869,357 | B2 | 3/2005 | Adams et al. |
| 6,890,256 | B2 | 5/2005 | Walker et al. |
| 6,890,257 | B2 | 5/2005 | Baerlocher |
| 6,899,623 | B2 | 5/2005 | Baerlocher |
| 6,939,224 | B2 | 9/2005 | Palmer et al. |
| 6,942,566 | B2 | 9/2005 | Baerlocher et al. |
| 6,942,567 | B2 | 9/2005 | Baerlocher et al. |
| 6,955,356 | B2 | 10/2005 | Moody |
| 6,960,132 | B2 | 11/2005 | Baerlocher et al. |
| 6,964,418 | B2 | 11/2005 | Moody |
| 6,966,833 | B2 | 11/2005 | Kaminkow et al. |
| 6,971,953 | B2 | 12/2005 | Gerrard et al. |
| 6,984,175 | B2 | 1/2006 | Nguyen et al. |
| 6,991,544 | B2 | 1/2006 | Soltys et al. |
| 7,001,273 | B2 | 2/2006 | Baerlocher |
| 7,004,466 | B2 | 2/2006 | Gauselmann |
| 7,025,674 | B2 | 4/2006 | Adams et al. |
| 7,040,984 | B2 | 5/2006 | Mead |
| 7,063,618 | B2 | 6/2006 | Walker et al. |
| 7,094,149 | B2 | 8/2006 | Walker et al. |
| 7,137,628 | B2 | 11/2006 | Moody |
| 7,156,397 | B2 | 1/2007 | Moody et al. |
| 7,156,736 | B2 | 1/2007 | Adams et al. |
| 7,160,186 | B2 | 1/2007 | Cuddy et al. |
| 7,192,349 | B2 | 3/2007 | Baerlocher et al. |
| 7,222,857 | B2 | 5/2007 | Moody |
| 7,222,858 | B2 | 5/2007 | Moody |
| 7,235,010 | B2 | 6/2007 | Baerlocher |
| 7,250,001 | B2 | 7/2007 | Baerlocher et al. |
| 7,252,590 | B2 | 8/2007 | Palmer et al. |
| 7,264,545 | B2 | 9/2007 | Maya et al. |
| 7,270,604 | B2 | 9/2007 | Gerrard et al. |
| 7,326,114 | B2 | 2/2008 | Webb et al. |
| 7,329,182 | B2 | 2/2008 | Adams et al. |
| 7,331,864 | B2 | 2/2008 | Baerlocher |
| 7,361,087 | B2 | 4/2008 | Baerlocher et al. |
| 7,364,507 | B2 | 4/2008 | Baerlocher et al. |
| 7,404,762 | B2 | 7/2008 | Moody |
| 7,407,435 | B2 | 8/2008 | Baerlocher et al. |
| 7,416,485 | B2 | 8/2008 | Walker et al. |
| 7,419,162 | B2 | 9/2008 | Lancaster et al. |
| 7,431,644 | B2 | 10/2008 | Moody |
| 7,470,184 | B2 | 12/2008 | Baerlocher et al. |
| 7,494,413 | B2 | 2/2009 | Singer et al. |
| 7,566,272 | B2 | 7/2009 | Gerrard et al. |
| 7,572,184 | B2 | 8/2009 | Baerlocher et al. |
| 7,601,057 | B2 | 10/2009 | Kaminkow |
| 7,601,061 | B2 | 10/2009 | Jackson |
| 7,607,978 | B2 | 10/2009 | Palmer et al. |
| 7,625,282 | B2 | 12/2009 | Baerlocher et al. |
| 7,658,673 | B2 | 2/2010 | Baerlocher et al. |
| 7,658,674 | B2 | 2/2010 | Walker et al. |
| 7,722,451 | B2 | 5/2010 | Hughs-baird et al. |
| 7,722,456 | B2 | 5/2010 | Walker et al. |
| 7,722,463 | B2 | 5/2010 | Maya et al. |
| 7,731,582 | B2 | 6/2010 | Randall et al. |
| 7,749,068 | B2 | 7/2010 | Cuddy et al. |
| 7,758,417 | B2 | 7/2010 | Jorasch et al. |
| 7,771,271 | B2 | 8/2010 | Walker et al. |
| 7,785,195 | B2 | 8/2010 | Palmer et al. |
| 7,794,316 | B2 | 9/2010 | Palmer et al. |
| 7,874,911 | B2 | 1/2011 | Walker et al. |
| 7,878,901 | B2 | 2/2011 | Walker et al. |
| 7,887,412 | B2 | 2/2011 | Baerlocher |
| 7,901,287 | B2 | 3/2011 | Simms et al. |
| 7,905,772 | B2 | 3/2011 | Baerlocher et al. |
| 7,905,775 | B2 | 3/2011 | Walker et al. |
| 7,963,842 | B2 | 6/2011 | Ruymann |
| 7,976,382 | B2 | 7/2011 | Benbrahim |
| 8,038,524 | B2 | 10/2011 | Bryant et al. |
| 8,142,272 | B2 | 3/2012 | Walker et al. |
| 2001/0051540 | A1 | 12/2001 | Hindman et al. |
| 2002/0032049 | A1 | 3/2002 | Walker et al. |
| 2002/0147040 | A1 | 10/2002 | Walker et al. |
| 2002/0177479 | A1 | 11/2002 | Walker et al. |
| 2003/0013521 | A1 | 1/2003 | Cole et al. |
| 2003/0040360 | A1 | 2/2003 | Kaminkow |
| 2003/0078093 | A1 | 4/2003 | Simms et al. |
| 2003/0083126 | A1 | 5/2003 | Paulsen |
| 2003/0104862 | A1 | 6/2003 | Acres |
| 2003/0130024 | A1 | 7/2003 | Darby |
| 2003/0162584 | A1 | 8/2003 | Hughs-baird et al. |
| 2003/0162588 | A1 | 8/2003 | Brosnan et al. |
| 2003/0216169 | A1 | 11/2003 | Walker et al. |
| 2004/0010556 | A1 | 1/2004 | Kawakita et al. |
| 2004/0106444 | A1 | 6/2004 | Cuddy et al. |

(56) References Cited

U.S. PATENT DOCUMENTS

| | | | |
|---|---|---|---|
| 2004/0106454 | A1 | 6/2004 | Walker et al. |
| 2004/0110554 | A1 | 6/2004 | Bromfield |
| 2004/0162128 | A1 | 8/2004 | Baerlocher et al. |
| 2004/0195773 | A1 | 10/2004 | Masci et al. |
| 2005/0020342 | A1 | 1/2005 | Palmer et al. |
| 2005/0054413 | A1 | 3/2005 | Randall et al. |
| 2005/0130729 | A1 | 6/2005 | Baerlocher et al. |
| 2005/0170884 | A1 | 8/2005 | Okada |
| 2005/0187012 | A1 | 8/2005 | Walker et al. |
| 2006/0089195 | A1 | 4/2006 | Walker et al. |
| 2006/0121983 | A1 | 6/2006 | Walker et al. |
| 2006/0135238 | A1 | 6/2006 | Lancaster et al. |
| 2006/0154722 | A1 | 7/2006 | Walker et al. |
| 2006/0172791 | A1 | 8/2006 | Wolf |
| 2006/0211486 | A1 | 9/2006 | Walker et al. |
| 2006/0252527 | A1 | 11/2006 | Walker et al. |
| 2007/0045957 | A1 | 3/2007 | Blair |
| 2007/0087818 | A1 | 4/2007 | Walker et al. |
| 2007/0135206 | A1 | 6/2007 | Inamura |
| 2007/0155482 | A1 | 7/2007 | Walker et al. |
| 2007/0155483 | A1 | 7/2007 | Walker et al. |
| 2007/0155484 | A1 | 7/2007 | Walker et al. |
| 2007/0173318 | A1 | 7/2007 | Abbott |
| 2008/0020815 | A1 | 1/2008 | Lancaster et al. |
| 2008/0070674 | A1 | 3/2008 | Lancaster et al. |
| 2008/0076496 | A1 | 3/2008 | Baerlocher et al. |
| 2008/0076500 | A1 | 3/2008 | Lancaster et al. |
| 2008/0182655 | A1 | 7/2008 | Baerlocher et al. |
| 2008/0274789 | A1 | 11/2008 | Singer et al. |
| 2008/0300051 | A1 | 12/2008 | Walker et al. |
| 2009/0005144 | A1 | 1/2009 | Moody |
| 2009/0029756 | A1 | 1/2009 | Guest |
| 2009/0088252 | A1 | 4/2009 | Nicely et al. |
| 2009/0124344 | A1 | 5/2009 | Mitchell et al. |
| 2009/0131159 | A1 | 5/2009 | Englman et al. |
| 2010/0120502 | A1 | 5/2010 | Oberberger |
| 2010/0248821 | A1 | 9/2010 | Jorasch et al. |
| 2010/0252996 | A1 | 10/2010 | Aguilera |
| 2011/0130188 | A1 | 6/2011 | Walker et al. |
| 2011/0287832 | A1 | 11/2011 | Low et al. |

OTHER PUBLICATIONS

"International Preliminary Report on Patentability", PCT/US2012/054637 (12 pages), dated Aug. 12, 2014.

"International Search Report and Written Opinion", International Search Authority for PCT/US2012/054637 (13 pages), dated Dec. 20, 2012.

"Screenshots of "Multiplier" game and instructions on how to play "Multiplier" game", Printed on Jan. 16, 2012 from https://platform.rgsgames.com/game.do?nscode=CGC&currencycode=FPY&denomamount=1.0&uniqueid=freeplay&minbet=1.0&softwareid=200-0057-002&language=en&skincode=GM, last updated Jun. 29, 2004 (4 pages); Jan. 16, 2012.

GAMING SYSTEM, GAMING DEVICE, AND METHOD PROVIDING ONE OR MORE ALTERNATIVE WAGER PROPOSITIONS IF A CREDIT BALANCE IS LESS THAN A DESIGNATED WAGER AMOUNT

PRIORITY CLAIM

This application is a continuation of, and claims priority to and the benefit of U.S. patent application Ser. No. 15/876,799, which was filed on Jan. 22, 2018, which is a continuation of, and claims priority to and the benefit of U.S. patent application Ser. No. 15/287,298, which was filed on Oct. 6, 2016, and issued as U.S. Pat. No. 9,881,450 on Jan. 30, 2018, which is a continuation of, and claims priority to and the benefit of U.S. patent application Ser. No. 14/335,218, which was filed on Jul. 18, 2014, and issued as U.S. Pat. No. 9,466,174 on Oct. 11, 2016, which is a continuation of, and claims priority to and the benefit of U.S. patent application Ser. No. 13/369,089, which was filed on Feb. 8, 2012, and issued as U.S. Pat. No. 8,801,519 on Aug. 12, 2014, the entire contents of all of which are incorporated herein by reference.

BACKGROUND

For many years, wagering gaming machines (such as slot machines) included coin slots and required players to deposit coins or tokens into the coin slots to play the wagering game or games on the wagering gaming machines. When a player won or desired to cash out of one of these wagering gaming machines, the wagering gaming machine would pay out coins or tokens to the player. In the last ten to fifteen years, wagering gaming machines accepting coins or tokens have been and continue to be phased out and replaced with wagering gaming machines that accept paper currency or bills and that pay out with tickets (which are redeemable by the player for currency).

A large percentage of currently employed wagering gaming machines (such a slot wagering gaming machines, video poker wagering gaming machines, blackjack wagering gaming machines, and keno wagering gaming machines) require players to deposit paper currency or bills of different amounts (such as $1.00, $5.00, $10.00, $20.00, $50.00, and $100.00) into these wagering gaming machines to play one or more wagering games on these wagering gaming machines. A player will typically insert one or more bills into a wagering gaming machine. The wagering gaming machine will receive each bill, read each bill, and display the player's credit balance in the credit meter of the wagering gaming machine. Initially, the credit meter displays the player's credit balance as an amount equal to the total value of the bills deposited by the player. The credit meter will display the player's credit balance either as an amount or quantity of credits (such as 1000 credits) or as an amount of currency (such as $10.00). Certain wagering gaming machines enable the player to select how the credit meter displays the player's credit balance (i.e., either as an amount of currency or as an amount or quantity of credits). When the credit meter displays the player's credit balance as an amount of quantity of credits, the credit meter typically displays the credits in the denomination of the wagering gaming machine or in the selected denomination that the wagering gaming machine is currently employing. For example, if the wagering gaming machine is set at or is employing a $0.25 denomination or base wager amount, and the player has deposited $20.00, the credit meter displays 80 credits.

Certain wagering gaming machines are set at a specific base wager amount or denomination, such as $0.01, $0.05, $0.10, $0.25, $0.50, or $1.00. Other wagering gaming machines enable the player to select a base wager amount or denomination from a plurality (such as four) of predetermined different base wager amounts or denominations, such as $0.05, $0.25, $0.50, and $1.00. Wagering gaming machines typically accept or enable the player to make wagers in multiples of the base wager amount or denomination that the wagering gaming machine is set at or that is selected by the player. A wagering gaming machine thus enables a player to use the player's credit balance displayed in the credit meter to make wagers on the wagering gaming machine. During play, a wager amount of each wager is deducted from the player's credit balance displayed by the credit meter, and each winning amount is added to the player's credit balance displayed by the credit meter.

As mentioned above, a wagering gaming machine typically enables a player to wager multiples of the set or employed base wager amount or denomination for each play of the wagering game. Typically, a wagering gaming machine requires a player to place at least a minimum wager having a minimum wager amount and at most a maximum wager having a maximum wager amount. For example, many $0.25 denomination slot machines each include one payline, and each of those slot machines enables a player to wager one, two, or three credits (i.e., $0.25, $0.50, or $0.75) on that payline for each play of that wagering or slot game on that slot machine. That is, in these example slot machines, the minimum wager (a 1 credit wager on the payline) has a minimum wager amount of 1 credit (or $0.25), and the maximum wager (a 3 credit wager on the payline) has a maximum wager amount of 3 credits (or $0.75). In another example, many $0.25 slot machines each include five paylines, and each of those slot machines enables a player to wager one, two, three, four, or five credits ($0.25, $0.50, $0.75, $1.00, or $1.25) on each of the five paylines for each play of the wagering or slot game on that slot machine. That is, in these example slot machines, the minimum wager (a 1 credit wager on one of the paylines) has a minimum wager amount of 1 credit (or $0.25), and the maximum wager (a 5 credit wager on each of the five paylines) has a maximum wager amount of 25 credits (or $6.25).

One widely known and implemented strategy for playing a multi-line or multiple payline slot machine is for a player to place a wager on each payline of that slot machine. Typically, in this strategy, the player places a wager having a minimum allowable wager amount on each payline. This enables the player to win an award if any winning symbol or winning symbol combination occurs on any of the paylines. For example, in the embodiments of the five payline $0.25 slot machines described above, a player implementing this strategy would wager 1 credit (the minimum allowable wager amount per payline) on each of the five paylines, resulting in a wager amount of 5 credits (or $1.25). Indeed, certain known slot machines require a player to wager on each payline when placing a wager on a play of those slot machines.

Another widely known and implemented strategy for playing a slot machine is for a player to place the maximum wager, as described above. For example, in the embodiments of the five payline $0.25 slot machines described above, a player implementing this strategy would place the maximum wager by wagering 5 credits (the maximum allowable wager amount per payline) on each of the five paylines, resulting in the maximum wager amount of 25 credits (or $6.25). Wagering gaming machines typically have a MAX BET button that enables a player to quickly and easily place the maximum wager having the maximum wager amount for a play of the wagering game or games on those wagering gaming machines.

Wagering gaming machines, including slot machines, typically have paytables that provide a higher average expected payback percentage when a player places the maximum wager. One manner in which gaming machines provide such a higher average expected payback percentage when a player places the maximum wager is by employing one or more higher award multiples when the player places the maximum wager.

One example of a slot machine paytable that employs higher award multiples when a player places the maximum wager is provided below. A slot machine employing this example slot machine paytable enables a player to wager on a single payline. The maximum wager allowed by this example slot machine is 3 credits on the single payline; that is, the maximum wager amount is 3 credits (e.g., $3.00 if the slot machine is a $1.00 denomination slot machine). In this example slot machine paytable, the value of the top award in terms of the award multiplier varies relative to the wager. That is, for wagers of 1 credit or 2 credits on the single payline (i.e., wagers less than the maximum wager of 3 credits in this example), the top award is 800 times the wager: 800 credits for the 1 credit wager and 1,600 credits for the 2 credit wager. On the other hand, for the maximum wager of 3 credits on the single payline, the top award is 1,000 times the wager, or 3,000 credits.

| | Wager Amount | | |
|---|---|---|---|
| Winning Symbol Combination | 1 Credit | 2 Credits<br>Award (credits) | 3 Credits |
| Three Double Diamond Symbols | 800 | 1,600 | 3,000 |
| Three Sevens | 80 | 160 | 240 |
| Three Triple Bars | 40 | 80 | 120 |
| Three Double Bars | 25 | 50 | 75 |
| Three Single Bars or Cherries | 10 | 20 | 30 |
| Three of Any Bar or Two Cherries | 5 | 10 | 15 |
| Any 1 Cherry | 2 | 4 | 6 |

One example of a draw poker paytable that employs higher award multiples when a player places the maximum wager is provided below. A draw poker wagering gaming machine employing this example draw poker paytable enables a player to wager on a single hand of draw poker. The maximum wager allowed by this example draw poker wagering gaming machine is 5 credits on the single hand of draw poker; that is, the maximum wager amount is 5 credits (e.g., the $5.00 if the draw poker wagering gaming machine is a $1.00 denomination draw poker wagering gaming machine). In this example draw poker paytable, the value of the top award in terms of the award multiplier varies relative to the wager. That is, for wagers of 1 credit, 2 credits, 3 credits, or 4 credits on the single hand (i.e., wagers less than the maximum wager of 5 credits in this example), the top award is 250 times the wager: 250 credits for the 1 credit wager, 500 credits for the 2 credit wager, 750 credits for the 3 credit wager, and 1,000 credits for the 4 credit wager. On the other hand, for the maximum wager of 5 credits on the single hand, the top award is 800 times the wager, or 4,000 credits.

| | Wager Amount | | | | |
|---|---|---|---|---|---|
| Winning Hand | 1 Credit | 2 Credits | 3 Credits<br>Award (credits) | 4 Credits | 5 Credits |
| Royal Flush | 250 | 500 | 750 | 1,000 | 4,000 |
| Straight Flush | 50 | 100 | 150 | 200 | 250 |
| Four of a Kind | 25 | 50 | 75 | 100 | 125 |
| Full House | 8 | 16 | 24 | 32 | 40 |
| Flush | 5 | 10 | 15 | 20 | 25 |
| Straight Flush | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

In other wagering gaming machines, if the player places the maximum wager, the player is eligible to win the top award, a jackpot award, or a large progressive award. Each of these awards is not typically winnable by the player if the player does not place the maximum wager (i.e., if the player wagers an amount less than the maximum wager amount) for that play of the wagering game.

One example of a slot machine paytable for a slot machine that enables a player to win one or more awards only if the player places the maximum wager is provided below. This example slot machine enables a player to place a wager of either 1 credit or 2 credits on a single payline. Thus, for a $1.00 denomination slot machine, the minimum wager is $1.00 and the maximum wager is $2.00. In this example, the awards associated with the various number seven symbols are only available to be won by the player if the player places the maximum wager of two credits ($2.00 in this example). It should be appreciated that, in this embodiment, the placement of the maximum wager does not increase the values of the other awards available to be won.

| | Wager Amount | |
|---|---|---|
| Winning Symbol Combination | 1 Credit<br>Award (Credits) | 2 Credits |
| Three Sizzling Sevens | — | 500 |
| Three Red Sevens | — | 150 |
| Three Mixed Sevens | — | 100 |
| Three Triple Bars | 60 | 60 |
| Three Double Bars | 40 | 40 |
| Three Single Bars | 20 | 20 |
| Three Any Bars | 10 | 10 |
| Three Blanks | 2 | 2 |

In other wagering gaming machines, if the player places the maximum wager, the player is eligible to win or play a bonus game if a bonus triggering symbol combination occurs, and if the player does not place the maximum wager, the player is not eligible to win or play a bonus game even if the bonus triggering symbol combination occurs.

One example slot machine paytable for a slot machine that illustrates this is provided below. This example slot machine enables a player to place a wager on one or more of five paylines. The maximum allowable wager per payline in this example slot machine on each payline is 1 credit. Thus, for this example slot machine, the maximum wager is one credit on each of the five paylines; that is, the maximum wager amount is 5 credits (e.g., $5.00 if this example slot machine is a $1.00 denomination slot machine). In this example slot machine paytable, the player can win entry into a bonus game only if the player places the maximum wager (i.e., wagers one credit on each of the five paylines) and if three Spin symbols appear along one of the five paylines. That is, in this example slot machine paytable, the player cannot win entry into the bonus game if the player does not place the maximum wager (i.e., wagers an amount less than the maximum wager amount).

| Winning Symbol Combination | Wager Amount 1 to 4 Credits | Max Bet |
|---|---|---|
| | Award (for the winning symbol combination along a wagered-on payline) | |
| Three Wheel of Fortune Symbols | 2,000 | Progressive Jackpot |
| Three Spin symbols | — | Play Bonus Game |
| Any combination of three Wheel of Fortune and Double Diamond Symbols | 800 | 800 |
| Three Sevens | 80 | 80 |
| Three Triple Bars | 40 | 40 |
| Three Double Bars | 25 | 25 |
| Three Triple Cherries | 10 | 10 |
| Three Single Bars | 10 | 10 |
| Three Any Bars | 5 | 5 |
| Any Two Triple Cherries | 5 | 5 |
| Any One Triple Cherry | 2 | 2 |

Internet or online wagering games typically offer the same betting structures, though there are certain differences. For instance, internet or online wagering games do not accept bills. To fund internet or online wagering games, a player must deposit funds by establishing an account associated with the online wagering games and transferring money into that account, such via a credit card, an electronic funds transfer, or any other suitable manner.

Another difference is that many internet or online cash casinos offering such wagering games offer a much wider range of wager amounts than their land-based counterparts. For example, the ratio between a minimum payline wager and a maximum payline wager for a slot machine in a land-based casino typically ranges from 2× to 5×, while the same ratio in internet or online cash casinos tends to be much higher, typically ranging from 50× to 500×. For this reason, online casinos are typically less likely to offer paytables having higher average expected payback percentages for maximum wagers.

In some implementations, a player's entire account balance is available for wagering on any particular internet or online wagering game. In other implementations, a player does not play an internet or online wagering game with the player's entire account balance at once. Rather, when the player desires to play an internet or online wagering game, the player transfers money from the player's account to that wagering game. The transferred money is displayed in the credit meter for that wagering game, and is available to be wagered on a play of that wagering game.

One significant problem for players of land based wagering gaming machines as well as for players of internet or online wagering games often arises when the player's credit balance in the credit meter is below or falls below the maximum wager amount for a play of the wagering game. In this situation, the player cannot place the maximum wager, and the player is sometimes referred to as having a sub-full-cover credit balance or bankroll. When this occurs, the player generally has three choices or options.

The first choice or option is for the player to add more money to the wagering gaming machine such that the player's credit balance equals or exceeds the maximum wager amount, thereby enabling the player to place the maximum wager on a play of the wagering game.

The second choice or option is for the player to cash out and obtain the player's remaining money on the wagering gaming machine. In wagering gaming machines that employ tickets to pay players, the player will receive a ticket and will later have to redeem this ticket. Specifically, after receiving the ticket, the player has to: (a) locate a ticket redeeming kiosk or casino cashier, (b) wait in line, and (c) wait while the ticket redeeming kiosk or the cashier makes change and provides it to the player. Since the value of the ticket will typically be low in this situation due to the player's credit balance being less than the maximum wager amount, many players consider this process a waste of time and a bother.

The third choice or option is for the player to place a wager other than the maximum wager (i.e., to wager an amount less than the maximum wager amount, such as by lowering the player's wager by reducing the wager per payline, the number of wagered-on paylines, or both in a multiple payline wagering game). Many players choose the third choice or option because: (a) they do not like or want to perform the first two options; and (b) this is the easiest method of handling this problem, even though the players know that this choice or option has several drawbacks or problems.

One significant problem with this third option for certain games is that the player will not be able to benefit from placing the maximum wager. That is, in certain embodiments (such as those described above with respect to the example paytables), the player will not be able to take advantage of certain award multipliers, win certain awards (such as the top award), and/or win entry into a bonus game when the player places a wager other than the maximum wager (i.e., wagers an amount less than the maximum wager amount). For example, if the winning symbol combinations for those top awards or those bonus games occur when the player does not place the maximum wager, the player will typically be very frustrated. Thus, this is not a great option for the player, and does not provide a good gaming experience.

Another common problem with this third option for wagering games having multiple paylines occurs when the player reduces the number of wagered-on paylines to reduce the amount wagered. Oftentimes, the player will achieve one or more wins after reducing the number of wagered-on paylines that would enable the player to wager on the maximum number of paylines, but the player neglects to increase the player's wager (either because the player did not notice the change in the player's credit balance or because the player's plan was to lose the player's remaining credit balance). The player then notices an outcome that did not lead to an award but that would have led to an award had the player wagered on all paylines. This frustrates the player, reduces player enjoyment, and does not provide a good gaming experience.

Nevertheless, in these situations, players will often just place a wager having the largest possible wager amount that the wagering gaming machine will allow based on the player's credit balance (i.e., the maximum allowable wager amount). In these situations in which the player's credit balance is less than the maximum wager amount, the maximum allowable wager amount is necessarily less than the maximum wager amount. If, after placing a wager having the maximum allowable wager amount on a play of the wagering game, the player does not win such that the player's credit balance is greater than the maximum wager amount, the player will typically repeat placing a wager having the maximum allowable wager amount (which is still less than the maximum wager amount in these situations), and will essentially bleed off or waste the player's remaining credit balance. For many players, this is a slow, painful, hopeless grind, and is detrimental to the players' gaming experiences.

These problems are further illustrated by the following example. In this example, a player deposits a $20 bill in a $0.01 denomination video slot machine that includes a 3×5 set of video reels, includes twenty-five paylines, and has a maximum allowable wager of 10 credits per payline. Thus, the maximum wager is 10 credits on each of the twenty-five paylines, and the maximum wager amount is 250 credits (or $2.50) per play of the slot game. Placing the maximum wager provides two benefits in this example. First, placing the maximum wager results in a wager being made on each of the twenty-five paylines, so that if a winning symbol combination occurs on any of the twenty-five paylines, the player will win a designated amount of credits based on that winning symbol combination and the amount of credits wagered on that payline (which is 10 credits when the player places the maximum wager). Second, when the player places the maximum wager, the player is eligible to win the top award of $20,000 (in this example) associated with achieving the top winning symbol combination on the twenty-fifth payline.

The following table shows an example series of plays.

| Play # | Credit Balance Before Wager (in credits) | Wager (in credits) | Credit Balance After Wager (in credits) | Awards from Play of Game (in credits) | Credit Balance After Awards (in credits) |
|---|---|---|---|---|---|
| 1 | 2000 | 250 | 1750 | 0 | 1750 |
| 2 | 1750 | 250 | 1500 | 0 | 1500 |
| 3 | 1500 | 250 | 1250 | 0 | 1250 |
| 4 | 1250 | 250 | 1000 | 300 | 1300 |
| 5 | 1300 | 250 | 1050 | 125 | 1175 |
| 6 | 1175 | 250 | 925 | 40 | 965 |
| 7 | 965 | 250 | 715 | 320 | 1035 |
| 8 | 1035 | 250 | 785 | 70 | 715 |
| 9 | 715 | 250 | 465 | 0 | 465 |
| 10 | 465 | 250 | 215 | 30 | 245 |
| 11 | 245 | 200 | 15 | 100 | 115 |
| 12 | 115 | 100 | 15 | 0 | 15 |
| 13 | 15 | 15 | 0 | 7 | 7 |
| 14 | 7 | 7 | 0 | 0 | 0 |

In this example, after the tenth play, the player can no longer place the maximum wager because the player has a credit balance of only 245 credits, which is less than the maximum wager amount of 250 credits. As mentioned above, the player at this point has three choices. If the player wants to keep placing the maximum wager to receive the full potential benefit of the play of the wagering game, the player would need to deposit more money on the wagering gaming machine such that the player's credit balance equals or exceeds the maximum wager amount of 250 credits. Alternatively, the player could cash out and receive $2.45. Alternatively, the player could place a wager other than the maximum wager having a wager amount less than the maximum wager amount.

In this example, the player chooses to place a wager other than the maximum wager having a wager amount less than the maximum wager amount. Specifically, the player places a wager of 8 credits on each of the paylines; that is, the player places a wager having a wager amount of 200 credits. This wager still provides the player the chance to play all of the paylines, but at a reduced wager amount per payline and thus a reduced potential award. That is, the player cannot win the top award, which reduces the player's interest in the play of the game and the tarnishes the player's overall gaming experience.

After the eleventh play, the player cannot place the maximum wager, but can still place a wager on all twenty-five paylines (i.e., by placing a wager of 4 credits on each of the twenty-five paylines; that is, by placing a wager having a wager amount of 200 credits).

After the twelfth play, the player cannot place the maximum wager because the player has 15 credits on the credit meter, and cannot wager on all 25 paylines because the minimum allowable wager per payline is 1 credit. In this example, for the thirteenth play, the player places a wager of 1 credit on each of 15 paylines; that is, the player places a wager having a wager amount of 15 credits.

After the thirteenth play, the player cannot place the maximum wager and cannot wager on all paylines. For the fourteenth play, the player places a wager of wagers 1 credit on each of 7 paylines; that is, the player places a wager having a wager amount of 7 credits.

After play the fourteenth play, the player's credit balance is 0, and the player cannot place any more wagers (without depositing more money on the wagering gaming machine).

This example gaming experience is poor for the player because: (a) the player lost $20; (b) the player likely feels and remembers the long string of losses rather than exciting wins that occurred earlier; (c) the slow bleed extended the player's sense of hopelessness; and (d) the player feels like the last four plays were futile plays in which the player was just wasting time and money, in part because the player could not win the top award for each of those plays of the wagering game.

In other words, when the player made the decision not to deposit more money and not to cash out the 245 credits (which is below the maximum wager amount), the player may feel as though the player was just wasting the $2.45.

This type of negative gaming experience can be made even worse when the allowable bets on a wagering gaming machine limit how a player can place a wager having an amount less than the maximum wager amount. Using the above example, if the wagering gaming machine only enables the player to place a wager on either 1 line, 5 lines, 10 lines, 15 lines, or 25 lines at a time (such by providing six different line wager buttons) (i.e., it does not allow the player to wager on any of 2, 3, 4, 6, 7, 8, 9, 11, 12, 13, 14, 16, 17, 18, 19, 20, 21, 22, 23, or 24 lines because the wagering gaming machine does not have buttons for these quantities of lines), then the player's game ending experience would even be worse. In the above example, the player could not place the wager having the wager amount of 7 credits for the fourteenth play, but could only place a wager having a wager amount of five credits, and assuming no win on that wager, would then have to place a wager having a wager amount of 2 credits. This would increase the length of the bleeding process and make the gaming experience worse because the player would feel that this is a complete waste of a play of the slot game.

It should be appreciated that this same type of problem occurs in other wagering gaming machines, such as multi-play draw poker wagering gaming machines in which the player can simultaneously wager on multiple draw poker hands (e.g., three hands, five hands, ten hands, fifty hands, or one hundred hands). For example, once a player's credit balance falls below the maximum wager amount, the player will have to place a wager on fewer total hands or, alternatively, place a wager having a relatively lower wager amount on the same number of hands.

One method that has been proposed in various published patent applications to address these issues is to allow for a negative credit balance for a player. However, to the knowledge of the above named inventors, casinos have not implemented wagering gaming machines that allow for negative credit balances, possibly because this provides a series of potential collection issues for the casinos.

The lack of viable solutions to these problems highlight the continuing need for new and effective solutions to these problems and the continuing need to enhance the gaming experience of players of wagering games.

SUMMARY

Various embodiments of gaming systems, gaming devices, and methods of the present disclosure solve the above-described problems by providing one or more alternative wagering propositions to a player when the player's credit balance is less than (or, in certain embodiments, less than or equal to) a designated wager amount. If the player accepts one of the alternative wager propositions, the player risks an amount of the player's remaining credit balance for a chance to win an alternative award. If the player wins the alternative award, the gaming system enables the player to play one or more plays of the wagering game at the designated wager amount. If the player does not win the alternative award, the gaming system reduces the player's credit balance by the amount risked.

The gaming system is configured to operate one or more wagering games upon a wager by a player. An amount of the wager is at least a minimum wager amount and at most a maximum wager amount. In various embodiments, after the occurrence of a triggering event, the gaming system determines if a credit balance of the player is less than a designated wager amount that is less than the maximum wager and greater than a lowest eligible amount. If the gaming system determines that the player's credit balance is less than the designated wager amount, the gaming system displays one or more alternative wager propositions to the player. The alternative wager propositions are separate from and in addition to any wagers that can be placed by the player on any plays of the wagering game, and are provided regardless of any awards associated with any plays of the wagering game.

Each alternative wager proposition, if accepted, enables the player to risk an amount of the player's remaining credit balance to win an alternative award. Each alternative wager proposition is associated with a probability of providing the alternative award associated with that alternative wager proposition. After displaying the alternative wager propositions, the gaming system enables the player to accept one of the alternative wager propositions. If the player accepts one of the alternative wager propositions, the gaming system determines whether to provide the alternative award associated with the accepted alternative wager proposition based on the probability of providing the alternative award associated with the accepted alternative wager proposition. If the gaming system determines to provide the alternative award, the gaming system provides the alternative award such that the player is enabled to play one or more plays of wagering game at the designated wager amount. If the gaming system determines not to provide the alternative award, the gaming system reduces the player's credit balance by the amount risked.

It should thus be appreciated that the gaming system of the present disclosure solves many of the above-described problems by increasing the excitement of and enhancing the gaming experience of a wagering game player who has a low credit balance. Specifically, the gaming system of the present disclosure provides such a player a favorable proposition for risking the player's remaining (minimal) credit balance when that remaining credit balance is less than a designated wager amount, such as a maximum wager amount. That is, rather than: (a) requiring the player to deposit value to continue playing at the designated wager amount, (b) requiring the player to cash out a relatively low credit balance and take multiple steps to redeem that low credit balance, or (c) effectively requiring the player to bleed off the player's remaining credit balance through a plurality of plays at small wager amounts, the gaming system of the present disclosure enables a player to risk an amount of that remaining credit balance for a chance to win the ability to play one or more plays of the wagering game at the designated wager amount. That is, the gaming system enables the player to risk little, i.e., a low credit balance or a small portion of a low credit balance that does not enable the player to receive the benefits of wagering the designated wager amount, in exchange for the chance to win the ability to play at least one play of the wagering game at the designated wager amount and, therefore, receive the benefits of wagering the designated wager amount. Offering this proposition enhances the player's gaming experience and provides the player with the excitement of winning (or possibly winning) a significant award.

Additional features and advantages are described herein, and will be apparent from, the following Detailed Description and the Figures.

DETAILED DESCRIPTION

Gaming Device and Electronics

The present disclosure may be implemented in various configurations for gaming machines, gaming devices, or gaming systems, including but not limited to: (1) a dedicated gaming machine, gaming device, or gaming system wherein the computerized instructions for controlling any games (that are provided by the gaming machine or gaming device) are provided with the gaming machine or gaming device prior to delivery to a gaming establishment; and (2) a changeable gaming machine, gaming device, or gaming system wherein the computerized instructions for controlling any games (that are provided by the gaming machine or gaming device) are downloadable to the gaming machine or gaming device through a data network after the gaming machine or gaming device is in a gaming establishment. In one embodiment, the computerized instructions for controlling any games are executed by at least one central server, central controller, or remote host. In such a "thin client" embodiment, the central server remotely controls any games (or other suitable interfaces), and the gaming device is utilized to display such games (or suitable interfaces) and receive one or more inputs or commands from a player. In another embodiment, the computerized instructions for controlling any games are communicated from the central server, central controller, or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling the base or primary game of the present disclosure are communicated from the central server to the gaming device in a thick client configuration and computerized instructions for controlling any secondary or bonus games or functions are executed by a central server in a thin client configuration.

Figure 1A:
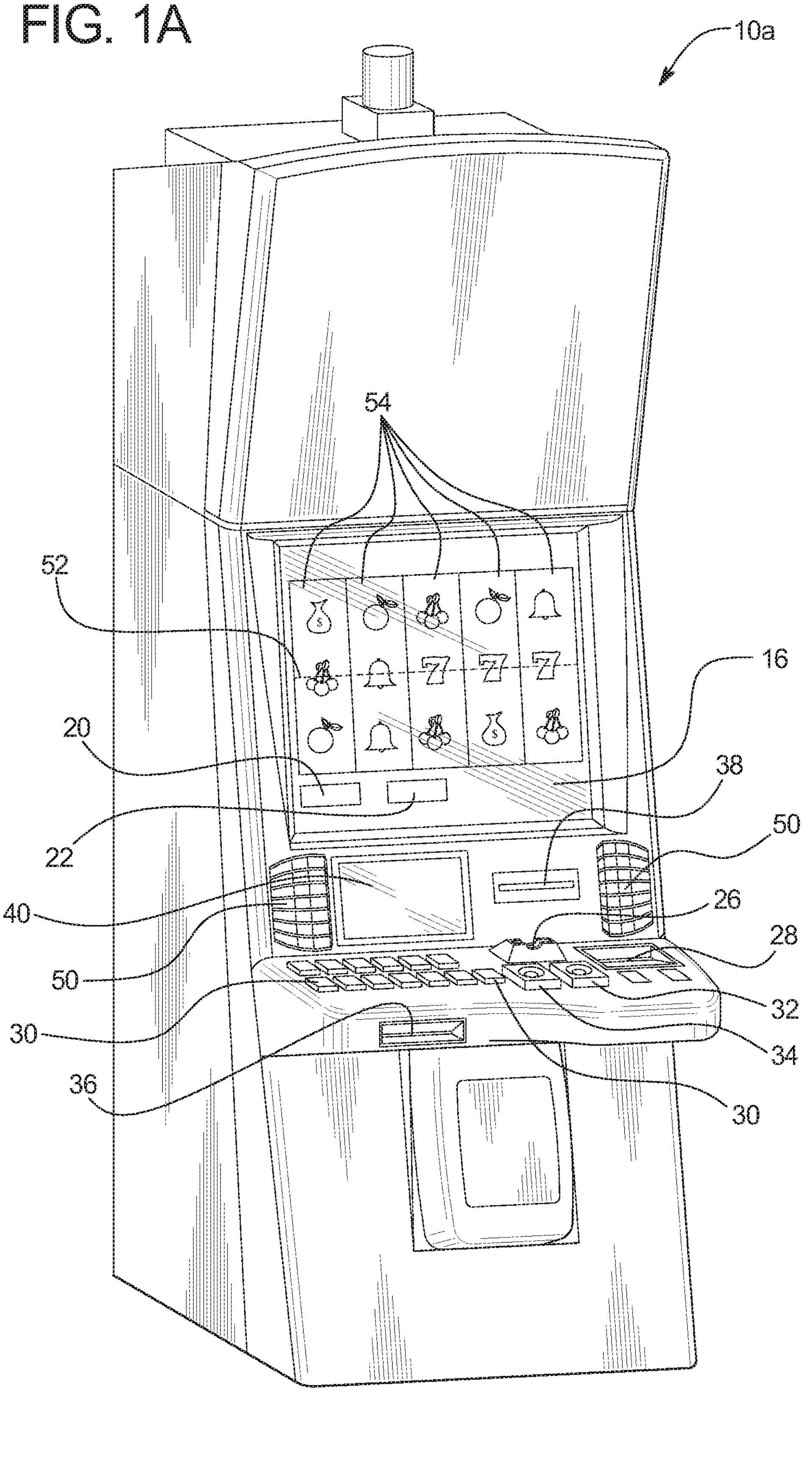
FIGS. 1A and 1B are perspective views of example alternative embodiments of a gaming device of the gaming system of the present disclosure.
Figure 1B:
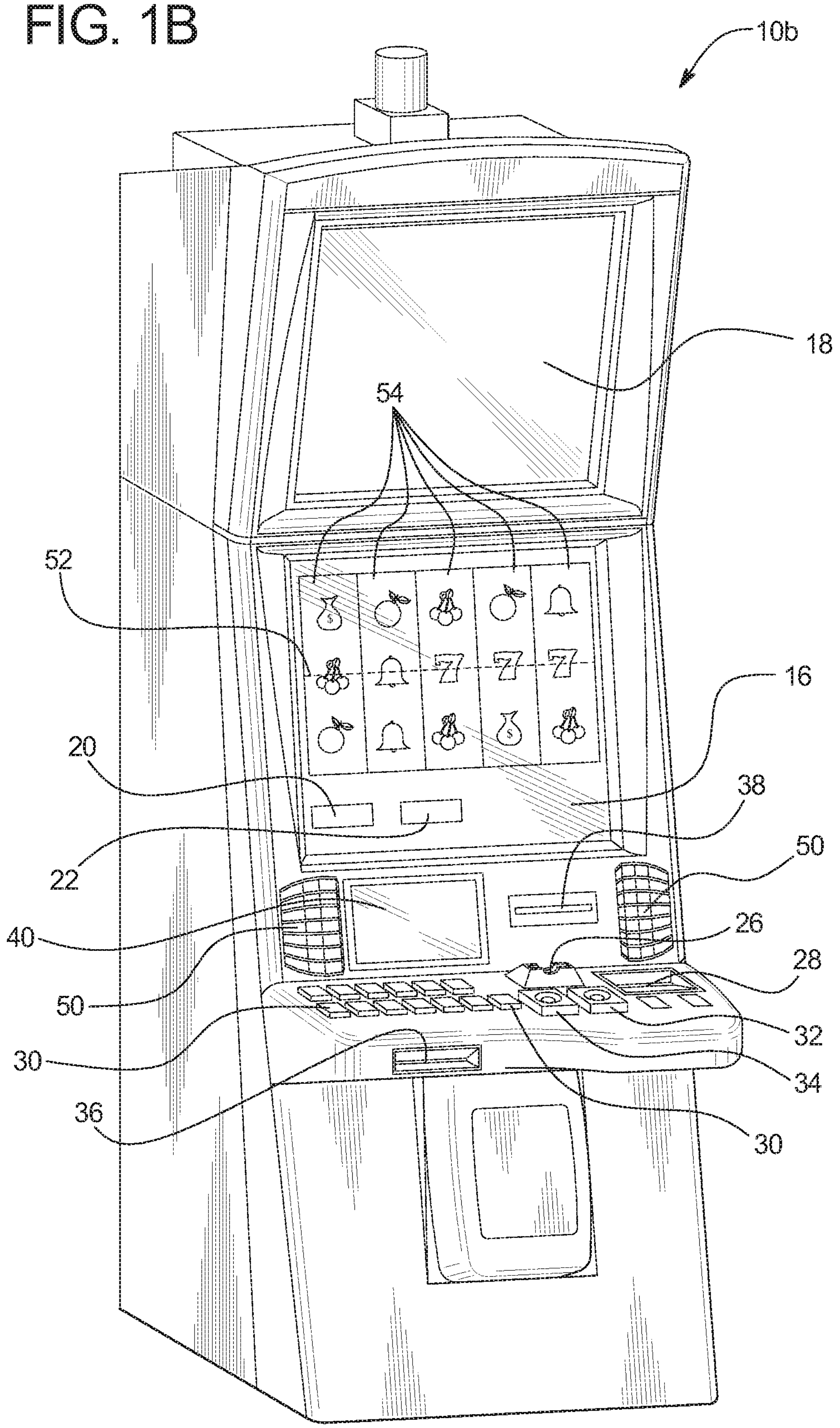

Referring now to the drawings, two example alternative embodiments of a gaming device disclosed herein are illustrated in FIGS. 1A and 1B as gaming device 10*a* and gaming device 10*b*, respectively. Gaming device 10*a* and/or gaming device 10*b* are generally referred to herein as gaming device 10.

In the embodiments illustrated in FIGS. 1A and 1B, gaming device 10 has a support structure, housing, or cabinet that provides support for a plurality of displays, inputs, controls, and other features of a conventional gaming machine. It is configured so that a player may operate it while standing or sitting. The gaming device may be positioned on a base or stand or may be configured as a pub-style table-top game (not shown) that a player may operate preferably while sitting. As illustrated by the different configurations shown in FIGS. 1A and 1B, the gaming device may have varying cabinet and display configurations.

Figure 2A:
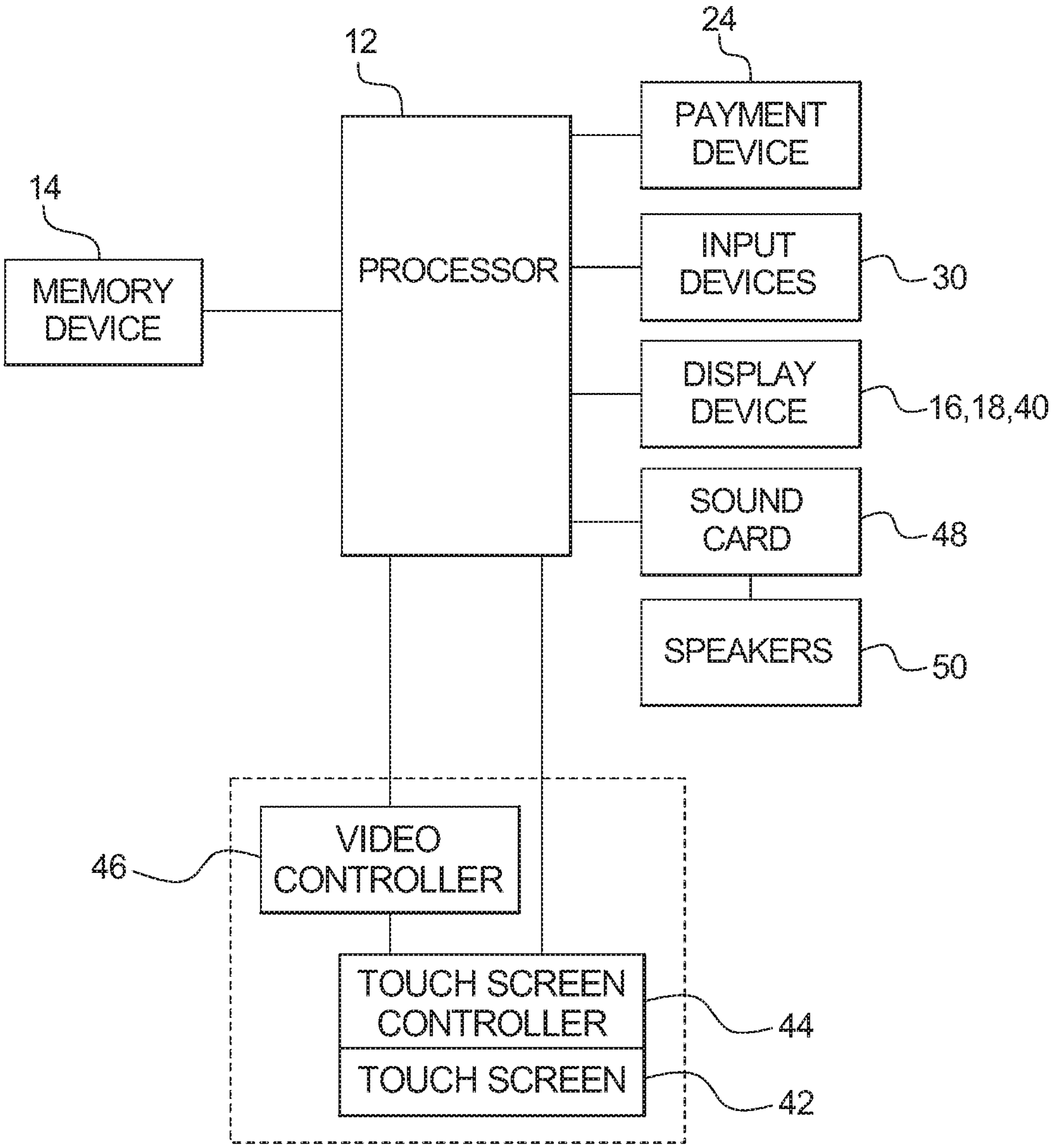
FIG. 2A is a schematic block diagram of one embodiment of an electronic configuration for one of the gaming devices of the gaming system disclosed herein.

In one embodiment, as illustrated in FIG. 2A, the gaming device includes at least one processor 12, such as a microprocessor, a microcontroller-based platform, a suitable integrated circuit, or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information, and applicable game rules that relate to the play of the gaming device. In one embodiment, the memory device includes random access memory (RAM), which may include non-volatile RAM (NVRAM), magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above may be stored in a detachable or removable memory device, such as, but not limited to, a suitable cartridge, disk, CD ROM, DVD, non-transitory computer readable medium, or USB memory device. In other embodiments, part or all of the program code and/or operating data described above may be downloaded to the memory device through a suitable network.

In one embodiment, an operator or a player may use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, such as part of a wireless gaming system. In this embodiment, the gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted on the cabinet of the gaming device. The embodiment shown in FIG. 1A includes a central display device 16 that displays any suitable base or primary game. This display device may also display any suitable secondary or bonus game associated with the base or primary game as well as information relating to the base or primary game or the secondary or bonus game. The alternative embodiment shown in FIG. 1B includes a central display device 16 and an upper display device 18. The upper display device may display the base or primary game, any suitable secondary or bonus game associated or not associated with the base or primary game, and/or information relating to the base or primary game or the secondary or bonus game. These display devices may also serve as digital glass operable to advertise games or other aspects of the gaming establishment. As shown in FIGS. 1A and 1B, in one embodiment, the gaming device includes a credit display 20 that displays a player's current number of credits, cash, account balance, or the equivalent. In one embodiment, the gaming device includes a bet display 22 that displays a player's amount wagered. In one embodiment, as discussed in more detail below, the gaming device includes a player tracking display 40 that displays information regarding a player's play tracking status.

In another embodiment, at least one display device may be a mobile display device, such as a PDA or tablet PC, that enables play of at least a portion of the base or primary game or the secondary or bonus game at a location remote from the gaming device.

The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In one embodiment, as discussed in more detail below, the display device includes a touch-screen with an associated touch-screen controller. The display devices may be of any suitable size and configuration, such as a square, a rectangle, or an elongated rectangle.

The display devices of the gaming device are configured to display at least one and preferably a plurality of game or other suitable images, symbols, and indicia such as any visual representation or exhibition of the movement of objects such as mechanical, virtual, or video reels and wheels; dynamic lighting; video images; images of people, characters, places, things, or faces of cards; and the like.

In one alternative embodiment, the symbols, images, and indicia displayed on or of the display device may be in mechanical form. That is, the display device may include any electromechanical device, such as one or more mechanical objects, such as one or more rotatable wheels, reels, or dice, configured to display at least one or a plurality of game or other suitable images, symbols or indicia.

As illustrated in FIG. 2A, in one embodiment, the gaming device includes at least one payment device 24 in communication with the processor. As shown in FIGS. 1A and 1B, a payment device such as a payment acceptor includes a note, ticket, or bill acceptor 28, into which the player inserts paper money, a ticket, or voucher and a coin slot 26 into which the player inserts money, coins, or tokens. In other embodiments, payment devices such as readers or validators for credit cards, debit cards, or credit slips may accept payment. In one embodiment, a player may insert an identification card into a card reader of the gaming device. In one embodiment, the identification card is a smart card having a programmed microchip, a coded magnetic strip, or coded rewritable magnetic strip, wherein the programmed microchip or magnetic strips are coded with a player's identification, credit totals (or related data), and/or other relevant information. In another embodiment, a player may carry a portable device, such as a cell phone, a radio frequency identification tag, or any other suitable wireless device, that communicates a player's identification, credit totals (or related data), and other relevant information to the gaming device. In one embodiment, money may be transferred to a gaming device through electronic funds transfer. When a player funds the gaming device, the processor determines the amount of funds entered and displays the corresponding amount on the credit or other suitable display as discussed above.

As shown in FIGS. 1A, 1B, and 2A, in one embodiment the gaming device includes at least one and preferably a plurality of input devices 30 in communication with the processor. The input devices may include any suitable device that enables the player to produce an input signal that is received by the processor. In one embodiment, after appropriate funding of the gaming device, the input device is a game activation device, such as a play button 32 or a pull arm (not shown) that is used by the player to start the base or primary game or sequence of events in the gaming device. The play button may be any suitable play activator such as a bet one button, a max bet button, or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player may increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) that enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment, or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card or smart card, may be implemented in accordance with the gaming device disclosed herein.

In one embodiment, as mentioned above and as shown in FIG. 2A, one input device is a touch-screen 42 coupled with a touch-screen controller 44 or some other touch-sensitive display overlay to allow for player interaction with the images on the display. The touch-screen and the touch-screen controller are connected to a video controller 46. A player may make decisions and input signals into the gaming device by touching the touch-screen at the appropriate locations. One such input device is a conventional touch-screen button panel.

The gaming device may further include a plurality of communication ports for enabling communication of the processor with external peripherals, such as external video sources, expansion buses, game or other displays, a SCSI port, or a keypad.

In one embodiment, as shown in FIG. 2A, the gaming device includes a sound generating device controlled by one or more sound cards 48 that function in conjunction with the processor. In one embodiment, the sound generating device includes at least one and preferably a plurality of speakers 50 or other sound generating hardware and/or software for generating sounds, such as by playing music for the base or primary game and/or the secondary or bonus game or by playing music for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized to provide any appropriate information.

In one embodiment, the gaming machine may include a sensor, such as a camera, in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in an analog, digital, or other suitable format. The display devices may be configured to display the image acquired by the camera and to display the visible manifestation of the game in split screen or picture-in-picture fashion. For example, the camera may acquire an image of the player and the processor may incorporate that image into the base or primary game and/or the secondary or bonus game as a game image, symbol, or indicia.

Gaming device 10 incorporates the base or primary game and any secondary or bonus game associated with the base or primary game. The gaming machine or device may include some or all of the features of conventional gaming machines or devices. The gaming device may incorporate any suitable reel-type game, card game, cascading or falling symbol game, number game, or other game of chance susceptible to representation in an electronic or electromechanical form as a secondary or bonus game or feature, which in one embodiment produces a random outcome based on probability data at the time of or after placement of a wager. That is, different base or primary games or secondary or bonus games, such as video poker games, video blackjack games, video keno games, and video bingo games may be implemented.

In one embodiment, the base or primary game and/or the secondary or bonus game includes one or more paylines 52 associated with a plurality of symbol display positions. The paylines may be horizontal, vertical, circular, diagonal, angled, or any combination thereof. In this embodiment, the gaming device includes at least one and preferably a plurality of reels 54, such as three to five reels, in either electromechanical form with mechanical rotating reels or video form with simulated reels and movement thereof. In one embodiment, an electromechanical slot machine includes a plurality of adjacent, rotatable reels that may be combined and operably coupled with an electronic display of any suitable type. In another embodiment, if the reels are in video form, one or more of the display devices, as discussed above, displays the plurality of simulated video reels. Each reel displays a plurality of indicia or symbols, such as bells, hearts, fruits, numbers, letters, bars, or other images that preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels stop spinning if specified types and/or configurations of indicia or symbols occur on an active payline or otherwise occur in a winning pattern, occur on the requisite number of adjacent reels, and/or occur in a scatter pay arrangement.

In an alternative embodiment, rather than determining any outcome to provide to the player by analyzing the symbols generated on any wagered upon paylines as discussed above, the gaming device determines any outcome to provide to the player based on the number of associated symbols that are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device that enables wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels modifies the number of ways to win.

In another embodiment, the gaming device enables a player to wager on and thus activate symbol positions. In one such embodiment, the symbol positions are on the reels. In this embodiment, if a reel is activated based on the player's wager, then each of the symbol positions of that reel will be activated and each of the active symbol positions will be part of one or more of the ways to win. In one embodiment, if a reel is not activated based on the player's wager, then a designated number of default symbol positions, such as a single symbol position of the middle row of the reel, will be activated and the default symbol position(s) will be part of one or more of the ways to win. This type of gaming machine enables a player to wager on one, more than one, or all of the reels, and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as discussed above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as discussed above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols that form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of two cherry symbols as complete.

After either adding a related symbol to the first string of related symbols or marking the first string of related symbols as complete, the gaming device proceeds as discussed above for each of the remaining classified strings of related symbols that were previously classified or formed from related symbols on the first and second reels.

After analyzing each of the remaining strings of related symbols, the gaming device determines, for each remaining pending or incomplete string of related symbols, if any of the symbols from the next adjacent reel should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to a quantity of awards being based on how many paylines that would have passed through each of the strings of related symbols in active symbol positions).

In one embodiment, base or primary game or the secondary or bonus game may be a poker game wherein the gaming device enables the player to play a conventional game of video draw poker and initially deals five cards all face up from a virtual deck of fifty-two cards. Cards may be dealt as in a traditional game of cards or in the case of the gaming device, the cards may be randomly selected from a predetermined number of cards. If the player wishes to draw, the player selects the cards to hold via one or more input devices, such as by pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table that utilizes conventional poker hand rankings to determine the winning hands. The gaming device provides the player with an award based on a winning hand and the number of credits the player wagered.

In another embodiment, the base or primary game or the secondary or bonus game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand against a payout table and awards are provided to the player.

In one embodiment, the base or primary game or the secondary or bonus game may be a keno game wherein the gaming device displays a plurality of selectable indicia or numbers on at least one of the display devices. In this embodiment, the player selects at least one of a plurality of the selectable indicia or numbers via an input device such as a touch screen. The gaming device then displays a series of drawn numbers and determines an amount of matches, if any, between the player's selected numbers and the gaming device's drawn numbers. The player is provided an award based on the amount of matches, if any, based on the amount of determined matches and the number of numbers drawn.

In one embodiment, as noted above, in addition to winning credits or other awards in the base or primary game, the gaming device may also give players the opportunity to win credits in a secondary or bonus game or in a secondary or bonus round. The secondary or bonus game enables the player to obtain a prize or payout in addition to the prize or payout, if any, obtained from the base or primary game. In general, a secondary or bonus game produces a significantly higher level of player excitement than the base or primary game because it provides a greater expectation of winning than the base or primary game, and is accompanied with more attractive or unusual features than the base or primary game. In one embodiment, the secondary or bonus game may be any type of suitable game, either similar to or completely different from the base or primary game.

In one embodiment, the triggering event or qualifying condition may be a selected outcome in the base or primary game or a particular arrangement of one or more indicia on a display device in the base or primary game, such as a BONUS symbol appearing on three adjacent reels along a payline in the base or primary game. In other embodiments, the triggering event or qualifying condition occurs based on exceeding a certain amount of game play (such as number of games, number of credits, amount of time), or reaching a specified number of points earned during game play.

In another embodiment, gaming device processor 12 or central controller 56 randomly provides the player one or more plays of one or more secondary or bonus games. In one such embodiment, the gaming device does not provide any apparent reason to the player for qualifying to play a secondary or bonus game. In this embodiment, qualifying for a secondary or bonus game is not triggered by an event in or based specifically on any of the plays of the base or primary game. That is, the gaming device may simply qualify a player to play a secondary or bonus game without any explanation or alternatively with simple explanations. In another embodiment, the gaming device (or central server) qualifies a player for a secondary or bonus game at least partially based on a game triggered or symbol triggered event, such as at least partially based on the play of the base or primary game.

In one embodiment, the gaming device includes a program that will automatically begin a secondary or bonus round after the player has achieved a triggering event or qualifying condition in the base or primary game. In another embodiment, after a player has qualified for a secondary or bonus game, the player may subsequently enhance the player's secondary or bonus game participation through continued play of the base or primary game. Thus, for each secondary or bonus qualifying event, such as a bonus symbol, that the player obtains, a given number of secondary or bonus game wagering points or credits may be accumulated in a "bonus meter" programmed to accrue the secondary or bonus wagering credits or entries toward eventual participation in a secondary or bonus game. The occurrence of multiple such secondary or bonus qualifying events in the base or primary game may result in an arithmetic or exponential increase in the number of secondary or bonus wagering credits awarded. In one embodiment, the player may redeem extra secondary or bonus wagering credits during the secondary or bonus game to extend play of the secondary or bonus game.

In one embodiment, no separate entry fee or buy-in for a secondary or bonus game is needed. That is, a player may not purchase entry into a secondary or bonus game; rather, the player must win or earn entry through play of the base or primary game, thus encouraging play of the base or primary game. In another embodiment, qualification of the secondary or bonus game is accomplished through a simple "buy-in" by the player—for example, if the player has been unsuccessful at qualifying through other specified activities. In another embodiment, the player must make a separate side-wager on the secondary or bonus game or wager a designated amount in the base or primary game to qualify for the secondary or bonus game. In this embodiment, the secondary or bonus game triggering event must occur and the side-wager (or designated base or primary game wager amount) must have been placed to trigger the secondary or bonus game.

Figure 2B:
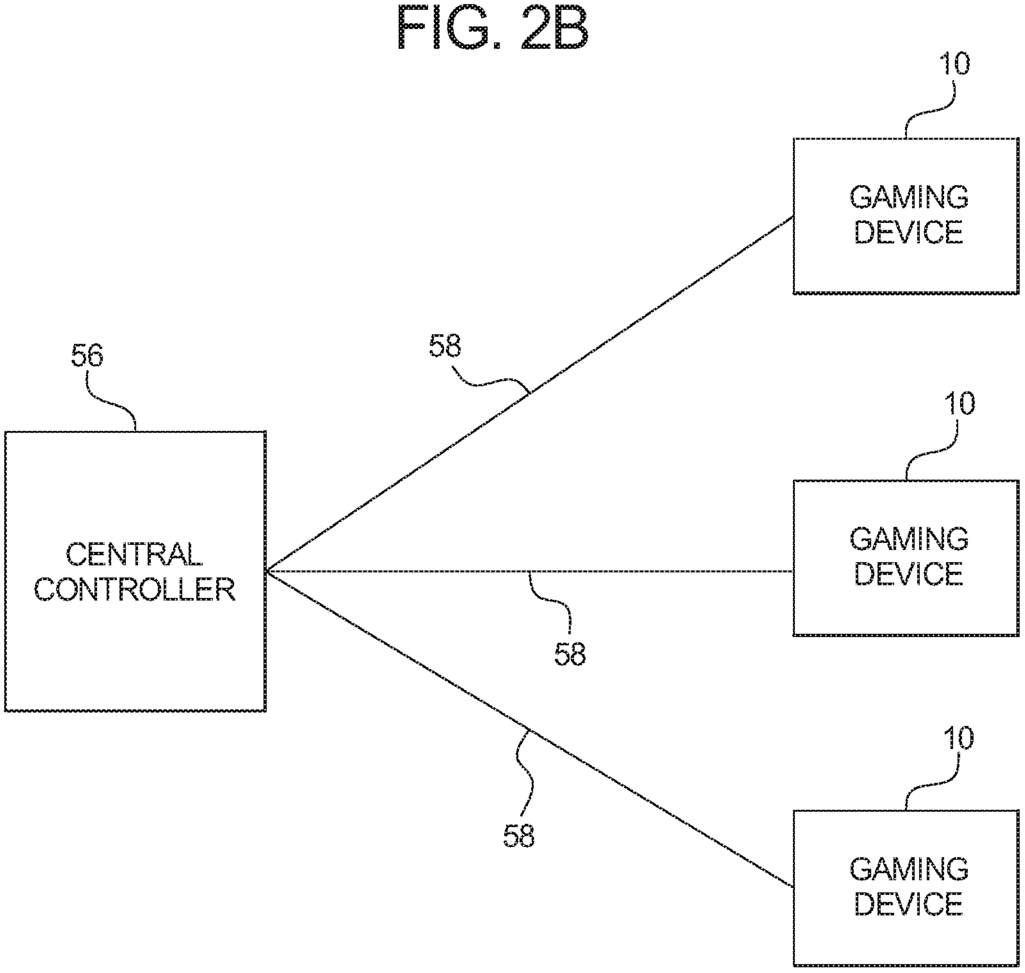
FIG. 2B is a schematic block diagram of one embodiment of a network configuration for a plurality of gaming devices of the gaming system disclosed herein.

In one embodiment, as illustrated in FIG. 2B, one or more of gaming devices 10 are in communication with each other and/or at least one central controller 56 through a data network or remote communication link 58. In this embodiment, the central server, central controller, or remote host is any suitable server or computing device that includes at least one processor and at least one memory or storage device. In different such embodiments, the central server is a progressive controller or a processor of one of the gaming devices in the gaming system. In these embodiments, the processor of each gaming device is designed to transmit and receive events, messages, commands, or any other suitable data or signal between the individual gaming device and the central server. The gaming device processor is operable to execute such communicated events, messages, or commands in conjunction with the operation of the gaming device. Moreover, the processor of the central server is designed to transmit and receive events, messages, commands, or any other suitable data or signal between the central server and each of the individual gaming devices. The central server processor is operable to execute such communicated events, messages, or commands in conjunction with the operation of the central server. It should be appreciated that one, more, or each of the functions of the central controller, central server, or remote host as disclosed herein may be performed by one or more gaming device processors. It should be further appreciated that one, more, or each of the functions of one or more gaming device processors as disclosed herein may be performed by the central controller, central server, or remote host.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the base or primary game based on probability data. In another embodiment, the central server or controller randomly generates a game outcome for the secondary or bonus game based on probability data. In another embodiment, the central server or controller randomly generates a game outcome for both the base or primary game and the secondary or bonus game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome may include a base or primary game outcome, a secondary or bonus game outcome, base or primary game and secondary or bonus game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control may assist a gaming establishment or other entity in maintaining appropriate records, controlling gaming, reducing and preventing cheating or electronic or other errors, reducing or eliminating win-loss volatility, and the like.

In another embodiment, a predetermined game outcome value is determined for each of a plurality of linked or networked gaming devices based on the results of a bingo, keno, or lottery game. In this embodiment, each individual gaming device utilizes one or more bingo, keno, or lottery games to determine the predetermined game outcome value provided to the player for the interactive game played at that gaming device. In one embodiment, the bingo, keno, or lottery game is displayed to the player. In another embodiment, the bingo, keno, or lottery game is not displayed to the player, but the results of the bingo, keno, or lottery game determine the predetermined game outcome value for the base or primary game or the secondary or bonus game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card with each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination may be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As discussed above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10, which will be provided to a first player regardless of how the first player plays in a first stage, and a second gaming device to have selected elements marked in a different predetermined pattern is provided a second outcome of win $2, which will be provided to a second player regardless of how the second player plays a second stage. It should be appreciated that as the process of marking selected elements continues until one or more predetermined patterns are marked, this embodiment ensures that at least one bingo card will win the bingo game, and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as discussed above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of whether the enrolled gaming device's provided bingo card wins or does not win the bingo game as discussed above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any player's gaming activity at the gaming device. In one such embodiment, the gaming device includes at least one card reader 38 in communication with the processor. In this embodiment, a player is issued a player identification card that has an encoded player identification number that uniquely identifies the player. When a player inserts the player's playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes the player's player tracking card when concluding play for that gaming session. In another embodiment, rather than requiring a player to insert a player tracking card, the gaming device utilizes one or more portable devices carried by a player, such as a cell phone, a radio frequency identification tag, or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) that are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to one another.

In another embodiment, the data network is an internet or intranet. In this embodiment, the operation of the gaming device may be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer or other internet facilitator is available. The expansion in the number of computers and number and speed of internet connections in recent years increases opportunities for players to play from an ever-increasing number of remote sites. It should be appreciated that the enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server-based gaming system. In one such embodiment, as discussed above, one or more gaming devices are in communication with a central server or controller. The central server or controller may be any suitable server or computing device that includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game that may be played on one or more of the gaming devices in the gaming system. Such different games may include the same or substantially the same game play with different pay tables. In different embodiments, the executable game program is for the base or primary game, a secondary or bonus game, or both. In another embodiment, the game program may be executable as a secondary or bonus game to be played simultaneous with the play of the base or primary game (that may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, or downloading or streaming the game program over a dedicated data network, internet, or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate the base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be achieved by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of the base or primary game. That is, a player is provided a progressive award without any explanation or, alternatively, with simple explanations. In another embodiment, a player is provided a progressive award at least partially based on a game triggered or symbol triggered event, such as at least partially based on the play of the base or primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager any credit amount during the base or primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the base or primary game of the gaming machines in the gaming system, via a gaming establishment or via any suitable manner.

In another embodiment, one or more of the progressive awards are partially funded via a side-bet or side-wager that the player may make (and that may be tracked via a side-bet meter). In one embodiment, one or more of the progressive awards are funded with only side-bets or side-wagers placed. In another embodiment, one or more of the progressive awards are funded based on players' wagers as discussed above as well as any side-bets or side-wagers placed.

In one alternative embodiment, a minimum wager level is required for a gaming device to qualify to be selected to obtain one of the progressive awards. In one embodiment, this minimum wager level is the maximum wager level for the base or primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as by playing together as a team or group, to win one or more awards. In one such embodiment, any award won by the group is shared, either equally or based on any suitable criteria, among the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Providing One or More Alternative Wager Propositions if a Credit Balance is Less than a Designated Wager Amount Various embodiments of the gaming systems, gaming devices, and methods of the present disclosure provide one or more alternative wager propositions to a player of a wagering game if a credit balance of the player is less than (or, in certain embodiments, less than or equal to) a designated wager amount. If the player accepts one of the alternative wager propositions, the player risks an amount of the player's remaining credit balance for a chance to win an alternative award. If the player wins the alternative award, the gaming system enables the player to play one or more plays of the wagering game at the designated wager amount. If the player does not win the alternative award, the gaming system reduces the player's credit balance by the amount risked.

The gaming system is configured to operate one or more wagering games upon a wager by a player. The wagering game(s) may be any suitable wagering game such as, but not limited to, a video slot or spinning reel game; a video poker, video blackjack, or other video card game; a video bingo game; a video keno game; or a video roulette game. For each play of the wagering game(s), the gaming system enables the player to place a wager having an amount that is at least a minimum wager amount and at most a maximum wager amount. It should be appreciated that the minimum wager amount and the maximum wager amount may be any suitable amounts.

The gaming system displays a credit balance of the player. Typically, the gaming system displays the player's credit balance on a credit meter. Initially, upon a deposit of value to the gaming system, the credit meter displays the player's credit balance as an amount equal to the total value deposited (e.g., the total value of any deposited bills or the total value of any deposited redeemable tickets). It should be appreciated that the credit meter displays the player's credit balance either as an amount or quantity of credits or as an amount of currency. The gaming system enables the player to use the player's credit balance (which is displayed in the credit meter) to place wagers on plays of the wagering game(s). For each play of a wagering game, the gaming system deducts a wager amount of a wager placed on that play of the wagering game from the player's credit balance (i.e., the credit meter displays the reduced credit balance), and adds amounts of any awards won for that play of the wagering game to the player's credit balance (i.e., the credit meter displays the increased credit balance if the player wins any awards).

It should be appreciated that "credits" as used herein refers to both: (a) credits that may be redeemed for a monetary amount or value (such as credits won during play of a wagering game at a gaming machine), and (b) credits that cannot be redeemed for a monetary amount or value (such as but not limited to credits for non-gambling slot-type games or promotional credits that may be used to wager on a play of a wagering game at a gaming machine but may not be directly redeemed for a monetary value).

In certain embodiments, after the occurrence of a triggering event, the gaming system determines if the player's credit balance is less than a designated wager amount. In other embodiments, after the occurrence of the triggering event, the gaming system determines if the player's credit balance is less than or equal to the designated wager amount. In various embodiments, the triggering event occurs: (a) upon the completion of a play of a wagering game and after the player's credit balance is updated to reflect any awards for that play of the wagering game; (b) when value (such as currency or a redeemable ticket) is deposited into the gaming system; (c) upon an indication that the player wishes to cash out any amount of the player's credit balance; (d) upon an indication that the player wishes to cash out an amount of the player's credit balance within a designated range of amounts; and/or (e) in embodiments in which a ticket is redeemable at a payment kiosk, upon insertion of that ticket into the payment kiosk. In certain embodiments, the triggering event is based on the player's credit balance and not based on any triggering events or conditions associated with any primary wagering games or any secondary or bonus games. That is, in these embodiments the triggering event is separate from, in addition to, distinct from, and independent of any other triggering events or conditions associated with any primary wagering games or any secondary or bonus games.

The designated wager amount is: (a) less than or equal to the maximum wager amount, and (b) greater than a lowest eligible amount. In various embodiments, the lowest eligible amount is: (a) zero, (b) an amount greater than zero, or (c) an amount greater than or equal to 1 credit (or the currency equivalent, e.g., $1.00 in a $1.00 denomination gaming machine). It should be appreciated that the designated wager amount may be any suitable wager amount within this range (i.e., less than or equal to the maximum wager amount and greater than the lowest eligible amount). In certain embodiments, the designated wager amount is an amount that can be expressed as an integer number of credits; that is, in such embodiments the designated wager amount is not an amount that can only be expressed as a fractional amount of credits. In one embodiment, the designated wager amount is equal to the maximum wager amount. In another embodiment, the designated wager amount is equal to the minimum wager amount. In a further embodiment in which the wagering game is a slot game including a plurality of paylines, the designated wager amount is a wager amount that enables a wager to be placed on each of the plurality of paylines. In another embodiment in which the wagering game is a card game including a plurality of hands of cards, the designated wager amount is a wager amount that enables a wager to be placed on each of the hands of cards.

In certain embodiments, an operator of a casino or other venue in which the gaming system is located determines the designated wager amount, while in other embodiments a manufacturer of the gaming system determines the designated wager amount. It should be appreciated that, in various embodiments, the designated wager amount is: (a) predetermined, (b) randomly determined, (c) determined based on a weighted probability table, (d) determined based on a wager by a player, (e) determined based on game play, (f) determined based on time of day, (g) any suitable combination thereof, or (h) determined in any other suitable manner.

If the gaming system determines that the player's credit balance is less than (or, in certain embodiments, less than or equal to) the designated wager amount, the gaming system displays one or more different options to the player and enables the player to select one of those options. The first option is a "try for a bigger bankroll" option that, if selected, enables the player to risk an amount of the player's remaining credit balance to win an alternative award (as described below). The second option is a "cash out" option that, if selected, causes the gaming system to cash the player out of the gaming system (e.g., causes the gaming system to cause a redeemable ticket having a value equal to the player's credit balance upon cash out to be provided to the player). The third option is a "return to game" option that, if selected by the player, enables the player to continue playing the wagering game (assuming the player's credit balance at least equals the minimum wager amount).

If the "try for a bigger bankroll" option is selected, the gaming system displays one or more different alternative wager propositions. It should be appreciated that, in certain embodiments, the gaming system displays one or more alternative wager propositions if the gaming system determines that the player's credit balance is less than (or, in certain embodiments, less than or equal to) the designated wager amount without displaying the one or more options to the player. That is, in these embodiments, the gaming system displays the alternative wager propositions without the "try for a bigger bankroll" option having first been selected.

The alternative wager propositions are separate from and in addition to any wagers that can be placed on any plays of the wagering game, and are provided regardless of any awards associated with any plays of the wagering game. That is, the alternative wager propositions concern the player's credit balance rather than any specific award or awards won by the player for a play of the wagering game. It should be appreciated that the quantity of displayed alternative wager propositions may be: (a) predetermined, (b) randomly determined, (c) determined based on a weighted probability table, (d) determined based on a wager by a player, (e) determined based on game play, (f) any suitable combination thereof, or (g) determined in any suitable manner. It should further be appreciated that which specific alternative wager propositions are displayed are: (a) predetermined, (b) randomly determined, (c) determined based on a weighted probability table, (d) determined based on a wager by a player, (e) determined based on game play, (f) any suitable combination thereof, or (g) determined in any suitable manner. For example, the quantity of displayed alternative wager propositions is based on the player's credit balance, and which specific alternative wager propositions are displayed is based on the denomination of the gaming machine at which the player is playing.

Each alternative wager proposition, if accepted, enables a player to risk an amount of the player's remaining credit balance to win an alternative award. In one embodiment, the amount risked is the player's entire remaining credit balance. In various other embodiments, the amount risked is: (a) one-half of the player's remaining credit balance, (b) one-third of the player's remaining credit balance, (c) one-fourth of the player's remaining credit balance, (d) all but a designated quantity of the player's remaining credit balance, or (e) any suitable quantity of the player's remaining credit balance. It should be appreciated that the amount risked may be: (a) predetermined, (b) determined by the player, (c) randomly determined, (d) determined based on a weighted probability table, (e) determined based on a wager by the player, (f) determined based on game play, (g) any suitable combination thereof, or (h) determined in any suitable manner.

In various embodiments (such as those in which the gaming system displays the player's credit balance as an amount or quantity of credits), the alternative award is a quantity of credits. In certain of these embodiments, if the alternative award is won, the gaming system reduces the player's credit balance by the amount risked and adds the quantity of credits to the player's credit balance. In such embodiments in which the amount risked is the player's entire credit balance, the quantity of credits is greater than the designated wager amount. In such embodiments in which the amount risked is less than the player's entire credit balance, the quantity of credits is a quantity that, when added to the player's credit balance after reducing the player's credit balance by the amount risked, results in the player's credit balance being greater than or equal to the designated wager amount. In another embodiment, if the alternative award is won, the gaming system adds the quantity of credits to the player's credit balance without reducing the player's credit balance by the amount risked. It should thus be appreciated that, in these embodiments, when the alternative award is won the gaming system enables the player to play one or more plays of the wagering game at the designated wager amount. In these embodiments, if the alternative award is not won (i.e., if the gaming system determines not to provide the alternative award, as explained further below), the gaming system reduces the player's credit balance by the amount risked.

In certain such embodiments, if the alternative award is won and the gaming system adds the quantity of credits to the player's credit balance, the gaming system enables the player to immediately cash out the added quantity of credits. In other such embodiments, if the alternative award is won and the gaming system adds the quantity of credits to the player's credit balance, the gaming system automatically initiates at least one additional play of the wagering game at the designated wager amount before enabling the player to cash out any the added quantity of credits.

In various embodiments (such as those in which the gaming system displays the player's credit balance as an amount of currency), the alternative award is an amount of currency. In certain of these embodiments, if the alternative award is won, the gaming system reduces the player's credit balance by the amount risked and adds the amount of currency to the player's credit balance. In such embodiments in which the amount risked is the player's entire credit balance, the amount of currency is greater than the designated wager amount. In such embodiments in which the amount risked is less than the player's entire credit balance, the amount of currency is an amount that, when added to the player's credit balance after reducing the player's credit balance by the amount risked, results in the player's credit balance being greater than or equal to the designated wager amount. In another embodiment, if the alternative award is won, the gaming system adds the amount of currency to the player's credit balance without reducing the player's credit balance by the amount risked. It should thus be appreciated that, in these embodiments, when the alternative award is won the gaming system enables the player to play one or more plays of the wagering game at the designated wager amount. In these embodiments, if the alternative award is not won (i.e., if the gaming system determines not to provide the alternative award, as explained further below), the gaming system reduces the player's credit balance by the amount risked.

In certain such embodiments, if the alternative award is won and the gaming system adds the amount of currency to the player's credit balance, the gaming system enables the player to immediately cash out the added amount of currency. In other such embodiments, if the alternative award is won and the gaming system adds the amount of currency to the player's credit balance, the gaming system automatically initiates at least one additional play of the wagering game at the designated wager amount before enabling the player to cash out the added amount of currency.

In another embodiment, the alternative award is a quantity of free plays of the wagering game at the designated wager amount. In one such embodiment, if the alternative award is won, the gaming system reduces the player's credit balance by the amount risked and enables the player to play the quantity of free plays at the designated wager amount. In another such embodiment, if the alternative award is won, the gaming system enables the player to play the quantity of free plays at the designated wager amount without reducing the player's credit balance by the amount risked. In these embodiments, if the alternative award is not won (i.e., if the gaming system determines not to provide the alternative award, as explained further below), the gaming system reduces the player's credit balance by the amount risked.

In certain embodiments, the gaming system employs the same paytable used in standard plays of the wagering game for each of the quantity of free plays of the wagering game. In other embodiments, the gaming system employs a paytable different from the paytable used in standard plays of the wagering game for at least one of the quantity of free plays.

In a further embodiment, the alternative award is a quantity of free plays of one or more bonus games. In one such embodiment, if the alternative award is won, the gaming system reduces the player's credit balance by the amount risked and enables the player to play the quantity of free plays of the bonus game(s). In another such embodiment, if the alternative award is won, the gaming system enables the player to play the quantity of free plays of the bonus game(s) without reducing the player's credit balance by the amount risked. In these embodiments, if the alternative award is not won (i.e., if the gaming system determines not to provide the alternative award, as explained further below), the gaming system reduces the player's credit balance by the amount risked.

In one such embodiment, if the alternative award is won, the gaming system provides the player with one or more bonus credits, and enables the player to use those bonus credits to purchase one or more plays of one or more bonus games. For example, the gaming system provides the player with 10 bonus credits and enables the player to purchase one or more plays of one or more of the following bonus games: bonus game 1 for 10 bonus credits per play, bonus game 2 for 5 bonus credits per play, and bonus game 3 for 2 credits per play. It should be appreciated that, in certain embodiments, the gaming system does not enable the bonus credits to be converted into currency or wagering game credits.

Each alternative wager proposition is associated with a probability of providing the alternative award associated with that alternative wager proposition. In various embodiments, the probability of providing the alternative award is determined based on: (a) the player's credit balance; (b) the alternative award itself (e.g., the quantity of credits, amount of currency, or the quantity of free plays of the wagering game at the designated wager amount); or (c) both (a) and (b). In certain embodiments, for a given credit balance, the probability of providing the alternative award associated with an alternative wager proposition decreases as the value of the alternative award increases, and vice-versa. That is, for a given credit balance, the gaming system is less likely to provide a relatively more favorable alternative award than it is to provide a relatively less favorable alternative award. In other embodiments, for a given alternative award, the probability of providing that alternative award decreases as the player's credit balance decreases, and vice-versa. That is, for a given alternative award, the gaming system is more likely to provide that alternative award if the player's credit balance is relatively high, and is less likely to provide that alternative award if the player's credit balance is relatively low. It should thus be appreciated that, in general, the larger the gap between the player's credit balance and the alternative award (e.g., the quantity of credits, the amount of currency, or the quantity of free plays of the wagering game at the designated wager amount), the less likely it is that the gaming system will provide the alternative award.

In various embodiments, in addition to or instead of one or more of the above factors, the probability of providing the alternative award is: (a) determined based on a weighted probability table (such as a look-up table), (b) determined based on game play, (c) determined based on a player's status in a player loyalty program, (d) determined by an operator of a casino or other venue in which the gaming system is located, (e) determined by a manufacturer of the gaming system, or (f) any suitable combination thereof.

In certain embodiments, for each alternative wager proposition, when the gaming system displays that alternative wager proposition the gaming system also displays the probability of providing the alternative award associated with that alternative wager proposition or an indication or representation of that probability. The gaming system may do so in any suitable manner. For example, in one embodiment, the gaming system displays a percentage representing the probability of providing the alternative award. In another embodiment, the gaming system displays a wheel, one portion commensurate with the probability of providing the alternative award having one color and another portion commensurate with the probability of not providing the alternative award having another different color. For example, if the probability of providing the alternative award is 25% (and, therefore, the probability of not providing the alternative award is 75%), one-quarter of the wheel will have one color, such as green, and three-quarters of the wheel will have a different color, such as red. This enables the player to quickly visually determine the chance that the player will win the alternative award if the player chooses that alternative wager proposition. In another embodiment, the gaming system displays an edge-on wheel having a plurality of landings or pockets, similar to a roulette wheel. In this embodiment, certain of the pockets (commensurate with the probability of providing the alternative award) are associated with the gaming system providing the alternative award, and certain of the pockets (commensurate with the probability of not providing the alternative award) are associated with the gaming system not providing the alternative award. For example, if the probability of providing the alternative award is 25% (and, therefore, the probability of not providing the alternative award is 75%) and the wheel has twelve landings or pockets, assuming the landings or pockets are of the same size, one-quarter of the pockets (i.e., four pockets) will be associated with the gaming system providing the alternative award, and three-quarters of the pockets (i.e., eight pockets) will be associated with the gaming system not providing the alternative award.

After displaying the alternative wager propositions, the gaming system enables the player to accept one of the alternative wager propositions. It should be appreciated that the gaming system also enables the player to cash out of the gaming system or return to the wagering game without accepting any of the alternative wager propositions at this point. If one of the alternative wager propositions is accepted, the gaming system determines whether to provide the alternative award associated with the accepted alternative wager proposition based on the probability of providing the alternative award associated with the accepted alternative wager proposition. If the gaming system determines to provide the alternative award, the gaming system provides the alternative award such that the player is enabled to play one or more plays of wagering game at the designated wager amount. If the gaming system determines not to provide the alternative award, the gaming system reduces the player's credit balance by the amount risked.

In certain embodiments, the gaming system displays a representation of the alternative award determination while or after the gaming system determines whether to provide the alternative award. For example, in one embodiment in which the gaming system displays the colored wheel, the gaming system displays the wheel spinning about its center relative to a fixed pointer. When the wheel stops spinning, the color of the section of the wheel to which the pointer is pointing determines whether the gaming system provides or does not provide the alternative award. In another example, in an embodiment in which the gaming system displays the colored wheel, the gaming system holds the wheel static and displays a "chasing light" pointer around the wheel. When the chasing light pointer stops, the color of the section of the wheel adjacent to the pointer determines whether the gaming system provides or does not provide the alternative award. In another example, in one embodiment in which the gaming system displays the edge-on wheel, the gaming system displays an indicator (such as a ball) moving relative to the wheel and landing in one of the landings or pockets. The landing or pocket in which the indicator lands determines whether the gaming system provides or does not provide the alternative award. It should be appreciated that the gaming system may employ any suitable mechanism to display the representation of the alternative award determination.

It should be appreciated that the wagering game has an average expected payback percentage. Typically, the average expected payback percentage is equal to the probability of receiving an award multiplied by a value of the award and divided by a value of the wager. It should also be appreciated that each of the alternative wager propositions has an individual average expected payback percentage. It should further be appreciated that in embodiments including a plurality of displayed alternative wager propositions, the set of displayed alternative wager propositions has a collective average expected payback percentage. In various embodiments, if: (a) the individual average expected payback percentage of one any displayed alternative wager propositions or (b) the collective average expected payback percentage of any displayed alternative wager propositions is greater than (or, in certain embodiments, greater than or equal to) the average expected payback percentage of the wagering game, the gaming system requires the player to have played a designated quantity of plays (such as one play) of the wagering game while wagering at least the designated wager amount (or any other suitable wager amount) on each of those plays prior to displaying the alternative wager options (or displaying the "try for a bigger bankroll" option). This prevents players from depositing a low amount of value (such as a redeemable ticket representing a small quantity of credits) and taking advantage of the more favorable average expected payback percentage of the alternative wager proposition or propositions.

In various embodiments, the gaming system provides an alternative wager proposition associated with a probability of providing an alternative award only if that probability of providing the alternative award is greater than (or, in certain embodiments, greater than or equal to) a minimum probability. In other embodiments, the gaming system provides an alternative wager proposition associated with a probability of providing an alternative award only if that probability of providing the alternative award is less than (or, in certain embodiments, less than or equal to) a maximum probability.

In certain embodiments, the gaming system provides an alternative wager proposition or a set of alternative wager propositions only if the individual average expected payback percentage of that alternative wager proposition or the collective average payback percentage of that set of alternative wager propositions is greater than (or, in certain embodiments, greater than or equal to) a minimum average expected payback percentage. In other embodiments, the gaming system provides an alternative wager proposition or a set of alternative wager propositions only if the individual average expected payback percentage of that alternative wager proposition or the collective average expected payback percentage of that set of alternative wager propositions is less than (or, in certain embodiments, less than or equal to) a maximum average expected payback percentage.

In various embodiments, the gaming system provides one or more alternative wager propositions only if the player satisfies one or more conditions. In certain embodiments, at least one such condition is satisfied when: (a) the player has a player tracking account, (b) the player's player tracking ranking or level is at least a designated ranking or level, (c) a quantity of player tracking points of the player reaches a designated quantity, (d) a length of time of the player at the gaming system reaches a designated length, (e) an amount wagered by the player over a predetermined length of time or quantity of plays reaches a designated amount, (f) a length of time of the player in the casino or other venue in which the gaming system is located reaches a designated length of time, (g) a promotional period is active, (h) a total quantity of plays of wagering games played by the player reaches a designated quantity of plays; (i) a total amount of credits or currency won by the player reaches a designated amount won; (j) a total amount of credits or currency lost by the player reaches a designated amount lost; (k) a time of day reaches a designated time of day; (l) a play of a secondary or bonus game has not been provided within a designated amount of time; (m) a play of a secondary or bonus game has not been provided within a designated quantity of plays of wagering games; (n) the player has achieved a designated quantity of consecutive winning outcomes; (o) one or more designated events have occurred; (p) the player has achieved a designated quantity of consecutive losing outcomes; (q) a total quantity of winning outcomes achieved by the player reaches a designated quantity; (r) a total quantity of losing outcomes achieved by the player reaches a designated quantity; (s) a total quantity of coin-in reaches a designated quantity; (t) a credit balance of the player reaches a designated credit balance; (u) a total amount of currency deposited by the player reaches a designated amount; (v) a ticket, coupon, or promotion is inserted or otherwise entered (such as by typing in a promotion code or scanning a barcode); (w) a designated quantity of credits is transferred onto the gaming system; (x) player tracking points are converted into one or more credits; (y) merchandise is purchased on the gaming system (such as through the use of player tracking points); (z) a contribution is made to charity through the use of the gaming system; (aa) an update is posted onto a social networking website; (bb) a status is changed on a social networking website; (cc) a gaming establishment (such as a casino) is liked or shared via a social networking side; (dd) a specific winning symbol, winning symbol combination, or other outcome is achieved; (ee) a picture is submitted; (ff) an email address is supplied; and (gg) a survey is completed. and/or (hh) any other suitable event or series of events occurs.

In certain embodiments, the gaming system also displays a "play off credit balance" option if the gaming system determines that the player's credit balance is less than (or, in certain embodiments, less than or equal to) the designated wager amount. In these embodiments, if the player selects the "play off credit balance" option, the gaming system causes the player's remaining credit balance to be wagered on a play of the wagering game, displays the play of the wagering game, and provides any awards associated with the play of the wagering game. In various embodiments, the gaming system also displays the "play off credit balance" option when displaying the alternative wager propositions. It should be appreciated that in certain embodiments the "play off credit balance option" is in addition to any standard repeat bet button or input of the gaming system.

In certain embodiments, at least one of the alternative wager propositions is a play of a bonus game. In one such embodiment, a plurality of the alternative wager propositions are each a different bonus game. In another such embodiment, one of the alternative wager propositions is a bonus game that may otherwise be triggered during play of the gaming system. In a further such embodiment, one of the alternative wager propositions is a bonus game that may not otherwise be triggered during play of the gaming system.

In various embodiments, if the gaming system determines that the player's credit balance is less than (or, in some embodiments, less than or equal to) the designated wager amount, the gaming system enables the player to convert an amount of credits in the player's credit balance (such as the player's entire credit balance) into one or more player tracking points. Thus, in these embodiments, the player may receive a benefit in exchange for those credits instead of bleeding off a small remaining credit balance on what appear to be "wasted" plays of the wagering game or cashing out that small remaining credit balance.

In other embodiments, if the gaming system determines that the player's credit balance is less than (or, in some embodiments, less than or equal to) the designated wager amount, the gaming system enables the player to convert an amount of credits in the player's credit balance (such as the player's entire credit balance) into one or more alternative awards, such as discount coupons for the gift shop of the gaming establishment, free meals or shows, or drawing entries. Thus, in these embodiments, the player may receive a benefit in exchange for those credits instead of bleeding off a small remaining credit balance on what appear to be "wasted" plays of the wagering game or cashing out that small remaining credit balance.

In certain embodiments, if the gaming system determines that the player's credit balance is less than (or, in some embodiments, less than or equal to) the designated wager amount, the gaming system enables the player to convert player tracking points (which have previously been provided to the player) into a quantity of credits such that, when added to the player's credit balance, the quantity of credits causes the player's credit balance to at least equal the designated wager amount. For example, the designated wager amount is 100 credits for one embodiment of a gaming system of the present disclosure. In this example, the player has a credit balance of 95 credits. The gaming system enables the player to convert a certain number of the player's player tracking points into 5 credits which, when added to the player's credit balance, increase the player's credit balance to 100 credits to equal the designated wager amount. This enables a player to continue playing the wagering game at the designated wager amount without depositing additional value into the gaming system and enables the player to continue playing at the designated wager amount.

In an online or internet environment, certain embodiments of the gaming system include a "quick transfer" button or icon. In these embodiments, if the player's credit balance is less than the designated wager amount, the gaming system enables the player to select the quick transfer button. When the quick transfer button is selected, the gaming system retrieves an amount of credits from the player's account (which is associated with the gaming system) such that the player's credit balance is at least equal to the designated wager amount when the amount of credits is added to the player's credit balance. This enables a player to continue playing the wagering game at the designated wager amount without depositing additional value into the gaming system, and enables the player to continue playing at the designated wager amount.

FIGS. 3A, 3B, 3C, 3D, 3E, 3F, 3G, 3H, 3I, 3J, and 3K illustrate screen shots of one embodiment of the gaming system and gaming device of the present disclosure (referred to herein as the "gaming system") providing one or more alternative wager propositions to a player if the gaming system determines that the player's credit balance is less than a designated wager amount. In this example embodiment: (a) the triggering event occurs upon the completion of a play of the wagering game and after the player's credit balance is updated to reflect any awards for that play of the wagering game; (b) the designated wager amount is the maximum wager amount of 100 credits (explained below); (c) the amount risked associated with each of the alternative wager propositions is equal to the player's entire credit balance; (d) the alternative award associated with each alternative wager proposition is a quantity of credits greater than the designated wager amount (i.e., the maximum wager amount in this embodiment); and (e) the gaming system employs the "play off credit balance" option in certain circumstances (as described above).

In this example, the gaming system includes a display device 120 that displays a spinning reel-type wagering game (referred to herein as the "wagering game") including a plurality of symbol display areas 130*a*, 130*b*, 130*c*, 130*d*, 130*e*, 130*f*, 130*g*, 130*h*, 130*i*, 130*j*, 130*k*, 130*l*, 130*m*, 130*n*, and 130*o*, each of which is configured to display one of a plurality of symbols. Display device 120 displays a plurality of paylines for the wagering game, each of which is associated with a different plurality of the symbol display areas. Specifically, payline A 132*a* is associated with symbol display areas 130*a*, 130*b*, 130*c*, 130*d*, and 130*e*; payline B 132*b* is associated with symbol display areas 130*a*, 130*b*, 130*h*, 130*n*, and 130*o*; payline C 132*c* is associated with symbol display areas 130*f*, 130*g*, 130*h*, 130*i*, and 130*j*; payline D 132*d* is associated with symbol display areas 130*k*, 130*l*, 130*h*, 130*d*, and 130*e*; and payline E 132*e* is associated with symbol display areas 130*k*, 130*l*, 130*m*, 130*n*, and 130*o*. Payline A 132*a*, payline B 132*b*, payline C

132*c*, payline D 132*d*, and payline E 132*e* are sometimes referred to herein as paylines A, B, C, D, and E.

The gaming system enables a player to place a wager on one or more of the paylines for a play of the wagering game. That is, in this example, the gaming system enables the player to place a wager of a quantity of credits on each of one of, all of, or a plurality of but less than all of the paylines. In this example, a wager amount of the wager placed by the player is the sum of the quantity of credits wagered on each payline. The minimum wager that a player must place on a play of the wagering game in this example is a 1 credit wager on one of the paylines. Thus, the minimum wager amount is 1 credit in this example. The maximum wager that a player may place on a play of the wagering game in this example is a 20 credit wager on each of the five paylines. Thus, the maximum wager amount is 100 credits in this example.

Display device 120 displays a paytable 122 for the wagering game that includes a plurality of winning symbol combinations. Paytable 122 indicates the credit payout associated with each respective winning symbol combination. In this example, paytable 122 indicates the credit payout associated with each respective winning symbol combination when the player places the maximum wager having the maximum wager amount of 100 credits for a play of the wagering game. More specifically, winning symbol combination SEVEN-SEVEN-SEVEN-SEVEN-SEVEN is associated with an award of 10,000 credits; winning symbol combination DIAMOND-DIAMOND-DIAMOND-DIAMOND is associated with an award of 7,500 credits, winning symbol combination DOLLAR SIGN-DOLLAR SIGN-DOLLAR SIGN-DOLLAR SIGN-DOLLAR SIGN is associated with an award of 5,000 credits; winning symbol combination TRIPLE BAR-TRIPLE BAR-TRIPLE BAR-TRIPLE BAR is associated with an award of 2,000 credits; winning symbol combination ORANGE-ORANGE-ORANGE-ORANGE is associated with an award of 500 credits; winning symbol combination TRIPLE CHERRY-TRIPLE CHERRY-TRIPLE CHERRY is associated with an award of 250 credits; winning symbol combination BAR-BAR-BAR is associated with an award of 100 credits; and winning symbol combination CHERRY-CHERRY-CHERRY is associated with an award of 25 credits.

It should be appreciated that, in this embodiment, if a player places a wager other than the maximum wager (i.e., if the player wagers a wager amount less than the maximum wager amount) on a play of the wagering game, the paytable employed for that play of the wagering game does not include the top award shown in paytable 122. That is, in these instances in which a player does not place the maximum wager, the paytable does not include the top award of 10,000 credits for the SEVEN-SEVEN-SEVEN-SEVEN-SEVEN winning symbol combination.

It should be appreciated that, in various embodiments: (a) the wagering game may include, and the display device may display, any suitable quantity of symbol display areas in any suitable configuration or arrangement; (b) the wagering game may include, and the display device may display, any suitable quantity of paylines for the wagering game; (c) each of the displayed paylines may be associated with any suitable quantity of the symbol display areas and any suitable combination of the symbol display areas; (d) the gaming system may use any other suitable award determination other than a payline evaluation, such as a ways to win and/or a scatter pay award determination (described in detail above); (e) the paytable may be modified to reflect lower credit payouts when a wager that is less than the maximum wager is placed on a play of the wagering game; (f) any suitable paytable including any suitable quantity of winning symbol combinations may be employed; (g) any suitable combination of the symbols may be used as a winning symbol combination; (h) the winning symbol combinations may be associated with any suitable credit payouts; (i) any suitable quantity of paytables may be utilized; and (j) any suitable symbols may be employed and may include, for example, any suitable markings or indicia such as letters, numbers, or illustrations or pictures of objects.

Display device 120 displays an indication, notification, or message display area 121, which displays information, notifications, and/or messages before, during, or after play of the wagering game; a credit meter 124, which displays the player's credit balance in terms of a quantity of credits; a wager indicator or display 126, which displays any wager placed by the player for a play of the wagering game in terms of a quantity of credits; and an award indicator or display 128, which displays any award a player has won during a play of the wagering game in terms of a quantity of credits.

Figure 3A:
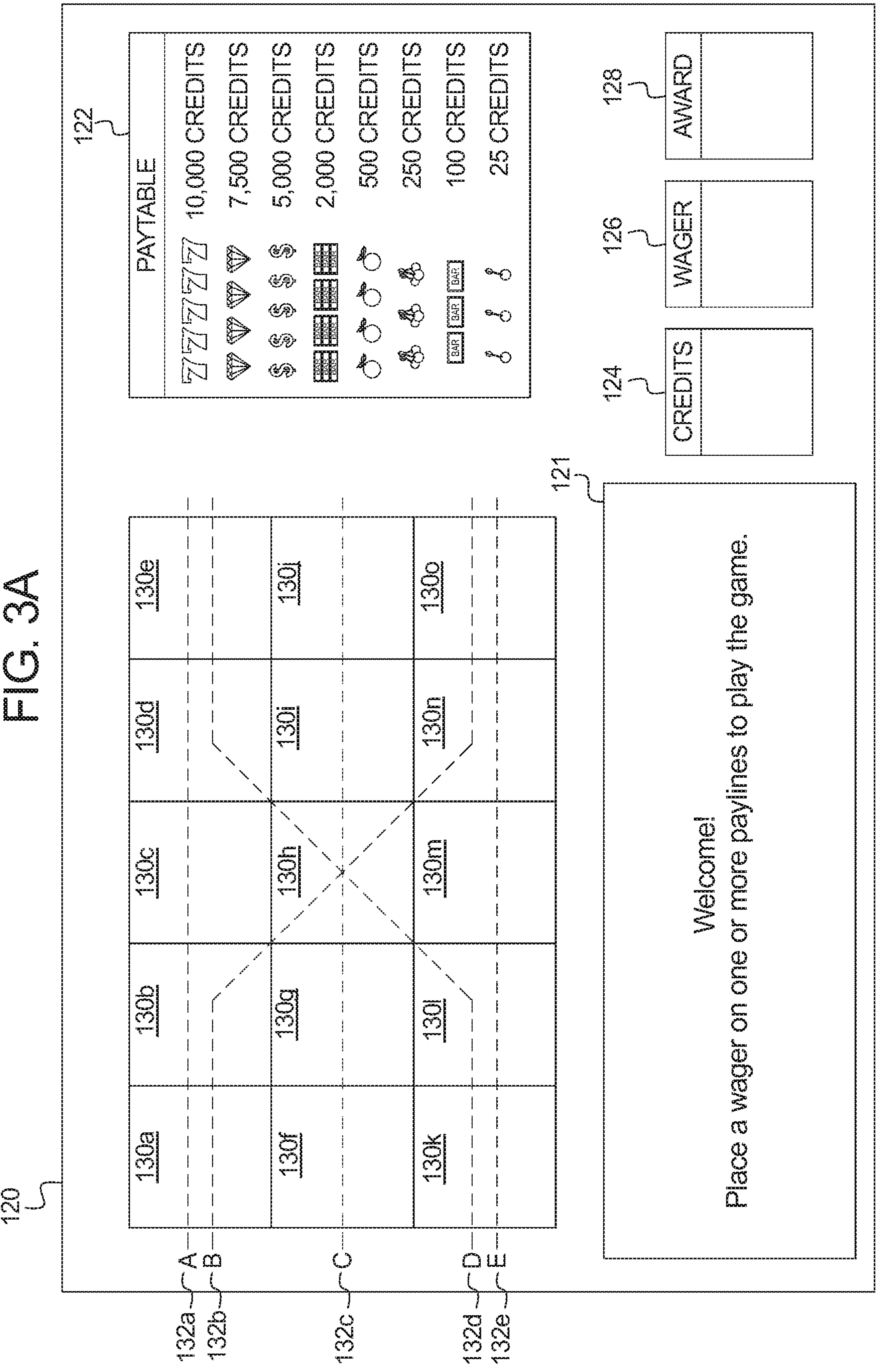
FIGS. 3A, 3B, 3C, 3D, 3E, 3F, 3G, 3H, 3I, 3J, and 3K are front views of a display device of one embodiment of the gaming system of the present disclosure, and illustrate: a plurality of example plays of a wagering game, a display of a plurality of alternative wager propositions, a selection of one of the displayed alternative wager propositions, and a representation of an alternative award determination.

As illustrated in FIG. 3A, in this embodiment, when the gaming system is not being played, message display area 121 displays a message that invites a player to place a wager on one or more of the paylines for a play of the wagering game.

Figure 3B:
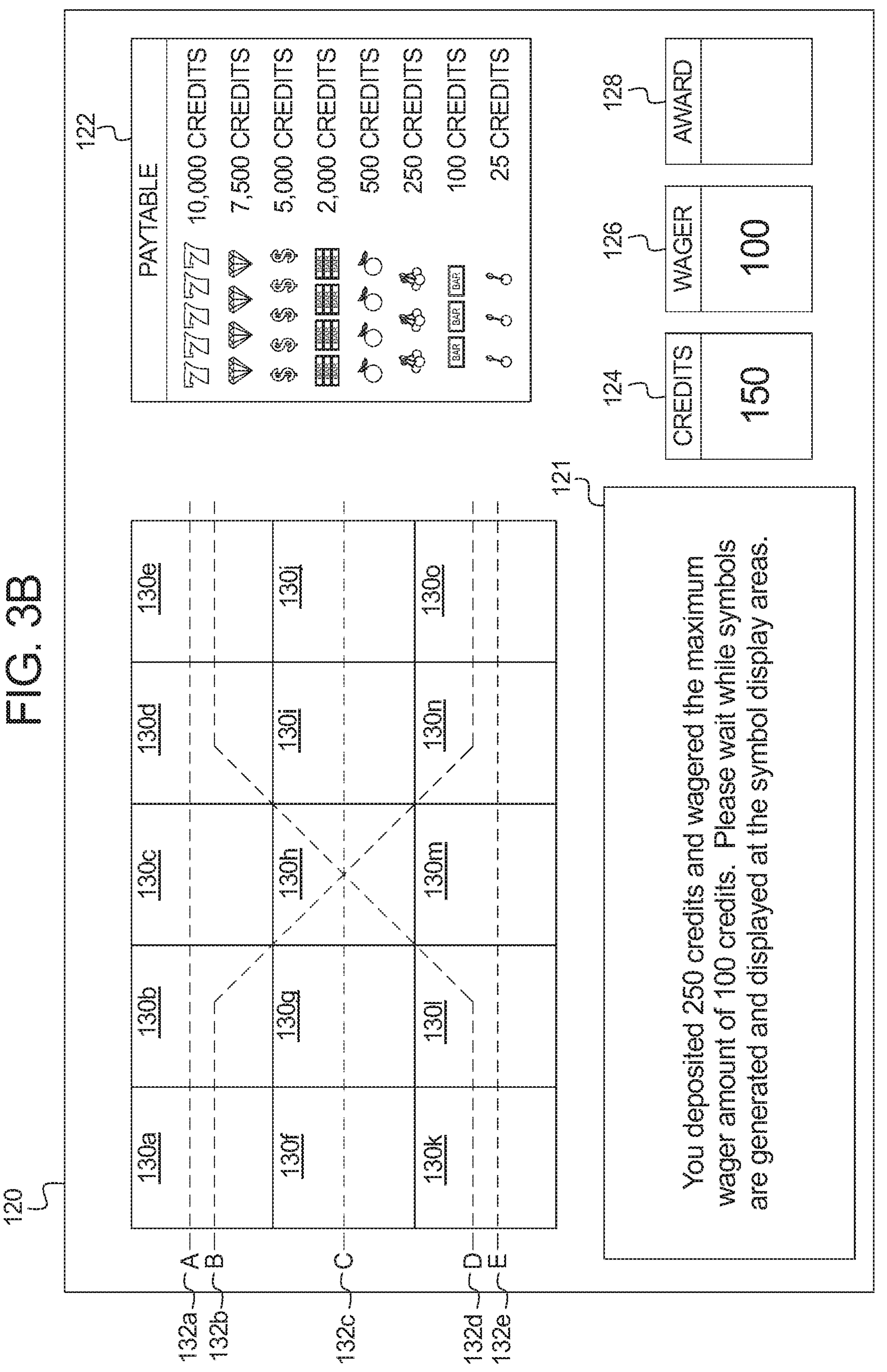

As illustrated in FIG. 3B, a player deposited currency and the gaming system provided the player with 250 credits. The player placed the maximum wager having the maximum wager amount of 100 credits (i.e., wagered 20 credits on each of paylines A, B, C, D, and E), which activated each of paylines A, B, C, D, and E and initiated a play of the wagering game. The maximum wager amount of 100 credits wagered by the player is displayed by wager indicator 126. The player's total remaining credit balance of 150 credits (i.e., the player's initial credit balance of 250 credits minus the player's wager of 100 credits) is displayed by credit meter 124.

Figure 3C:
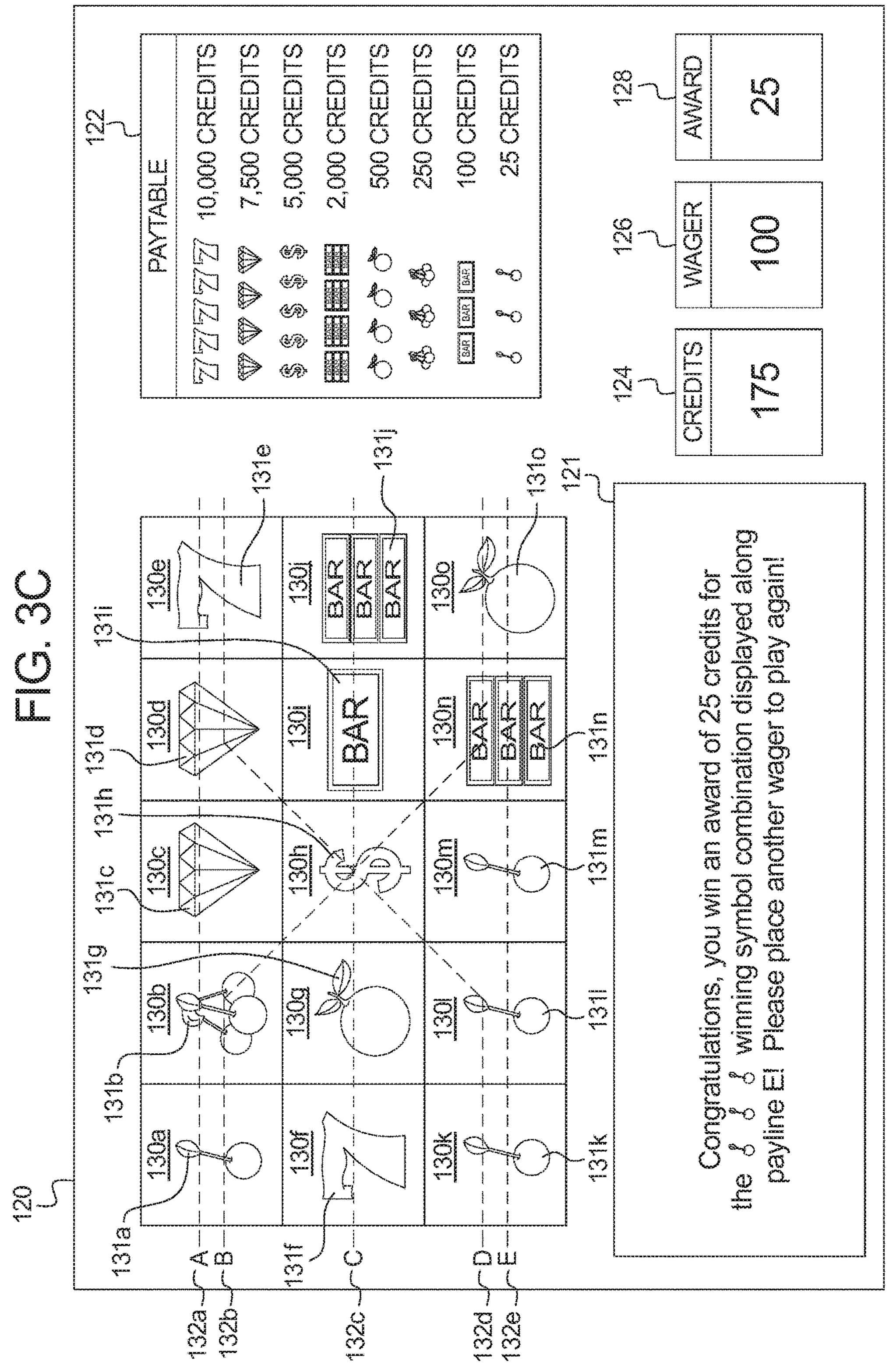

As illustrated in FIG. 3C, the gaming system generated and displayed one of the symbols at each of the symbol display areas for the wagered-on play of the wagering game. Specifically, the gaming system generated and displayed symbol 131*a* at symbol display area 130*a*, symbol 131*b* at symbol display area 130*b*, symbol 131*c* at symbol display area 130*c*, symbol 131*d* at symbol display area 130*d*, symbol 131*e* at symbol display area 130*e*, symbol 131*f* at symbol display area 130*f*, symbol 131g at symbol display area 130G, symbol 131*h* at symbol display area 130*h*, symbol 131*i* at symbol display area 130*i*, symbol 131*j* at symbol display area 130*j*, symbol 131*k* at symbol display area 130*k*, symbol 131*l* at symbol display area 130*l*, symbol 131*m* at symbol display area 130*m*, symbol 131*n* at symbol display area 130*n*, and symbol 1310 at symbol display area 130*o*.

After generating and displaying one of the symbols at each of the symbol display areas, the gaming system makes an award determination based on the displayed symbols. That is, the gaming system determines whether the displayed symbols form any of the winning symbol combinations included in paytable 122 along wagered-on paylines A, B, C, D, and/or E. As indicated by the message displayed in message display area 121, in this example the player wins 25 credits for the CHERRY-CHERRY-CHERRY winning symbol combination formed by symbol 131*k*, symbol 131*l*, and symbol 131*m* displayed from left to right along payline E. Accordingly, the player's 25 credit award is displayed by award indicator 128, and the player's credit balance displayed by credit meter 124 is increased to 175 credits.

After modifying the player's credit balance to reflect any awards following the play of the wagering game (i.e., after the triggering event occurs), the gaming system determines whether the player's credit balance is less than the designated wager amount, which is the maximum wager amount of 100 credits in this example. If the player's credit balance is less than the designated wager amount, the gaming system displays one or more alternative wager propositions as generally described above. If the player's credit balance is greater than or equal to the designated wager amount, the gaming system enables the player to continue placing wagers on plays of the wagering game. Here, since the player's credit balance of 175 credits is greater than the designated wager amount (i.e., the maximum wager amount of 100 credits), the gaming system enables the player to continue playing the wagering game, and the message displayed in message display area 121 prompts the player to place another wager for another play of the wagering game.

Figure 3D:
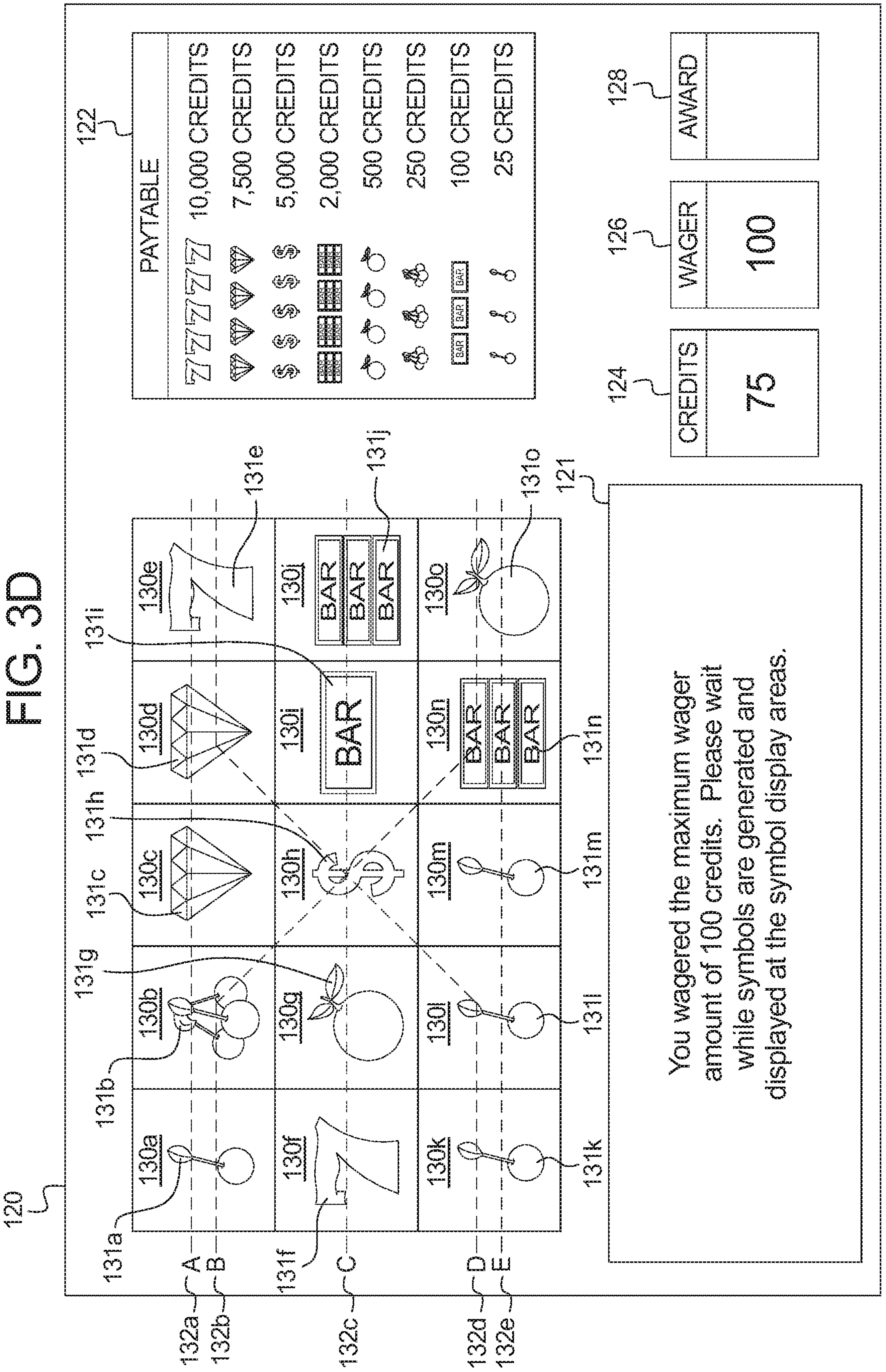

As illustrated in FIG. 3D, the player placed the maximum wager having the maximum wager amount of 100 credits (i.e., wagered 20 credits on each of paylines A, B, C, D, and E), which activated each of paylines A, B, C, D, and E and initiated a play of the wagering game. The maximum wager amount of 100 credits wagered by the player is displayed by wager indicator 126. The player's total remaining credit balance of 150 credits (i.e., the player's previous credit balance of 175 credits minus the player's wager of 100 credits) is displayed by credit meter 124.

Figure 3E:
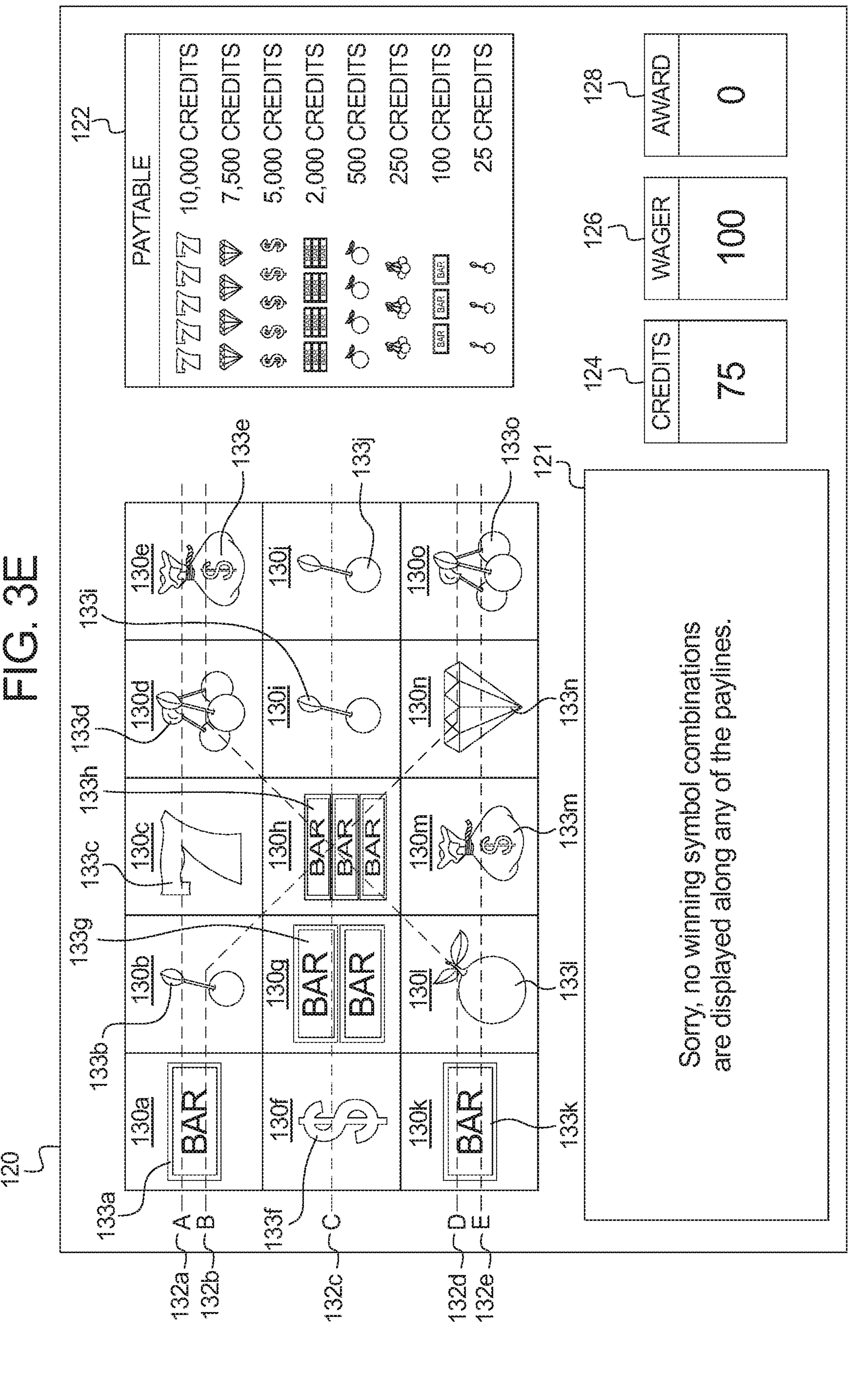

As illustrated in FIG. 3E, the gaming system generated and displayed one of the symbols at each of the symbol display areas for the wagered-on play of the wagering game. Specifically, the gaming system generated and displayed symbol 133*a* at symbol display area 130*a*, symbol 133*b* at symbol display area 130*b*, symbol 133*c* at symbol display area 130*c*, symbol 133*d* at symbol display area 130*d*, symbol 133*e* at symbol display area 130*e*, symbol 133*f* at symbol display area 130*f*, symbol 133*g* at symbol display area 130G, symbol 133*h* at symbol display area 130*h*, symbol 133*i* at symbol display area 130*i*, symbol 133*j* at symbol display area 130*j*, symbol 133*k* at symbol display area 130*k*, symbol 133*l* at symbol display area 130*l*, symbol 133*m* at symbol display area 130*m*, symbol 133*n* at symbol display area 130*n*, and symbol 133*o* at symbol display area 130*o*.

After generating and displaying one of the symbols at each of the symbol display areas, the gaming system makes an award determination based on the displayed symbols. That is, the gaming system determines whether the displayed symbols form any of the winning symbol combinations included in paytable 122 along wagered-on paylines A, B, C, D, and/or E. As indicated by the message displayed in message display area 121, in this example the no winning symbol combinations are displayed along any of the wagered-on paylines.

After modifying the player's credit balance to reflect any awards following the play of the wagering game (i.e., after the triggering event occurs), the gaming system determines whether the player's credit balance is less than the designated wager amount, which is the maximum wager amount of 100 credits in this example. Here, since the player's credit balance of 75 credits is less than the designated wager amount of 100 credits, the gaming system provides the player with one or more alternative wager propositions.

Figure 3F:
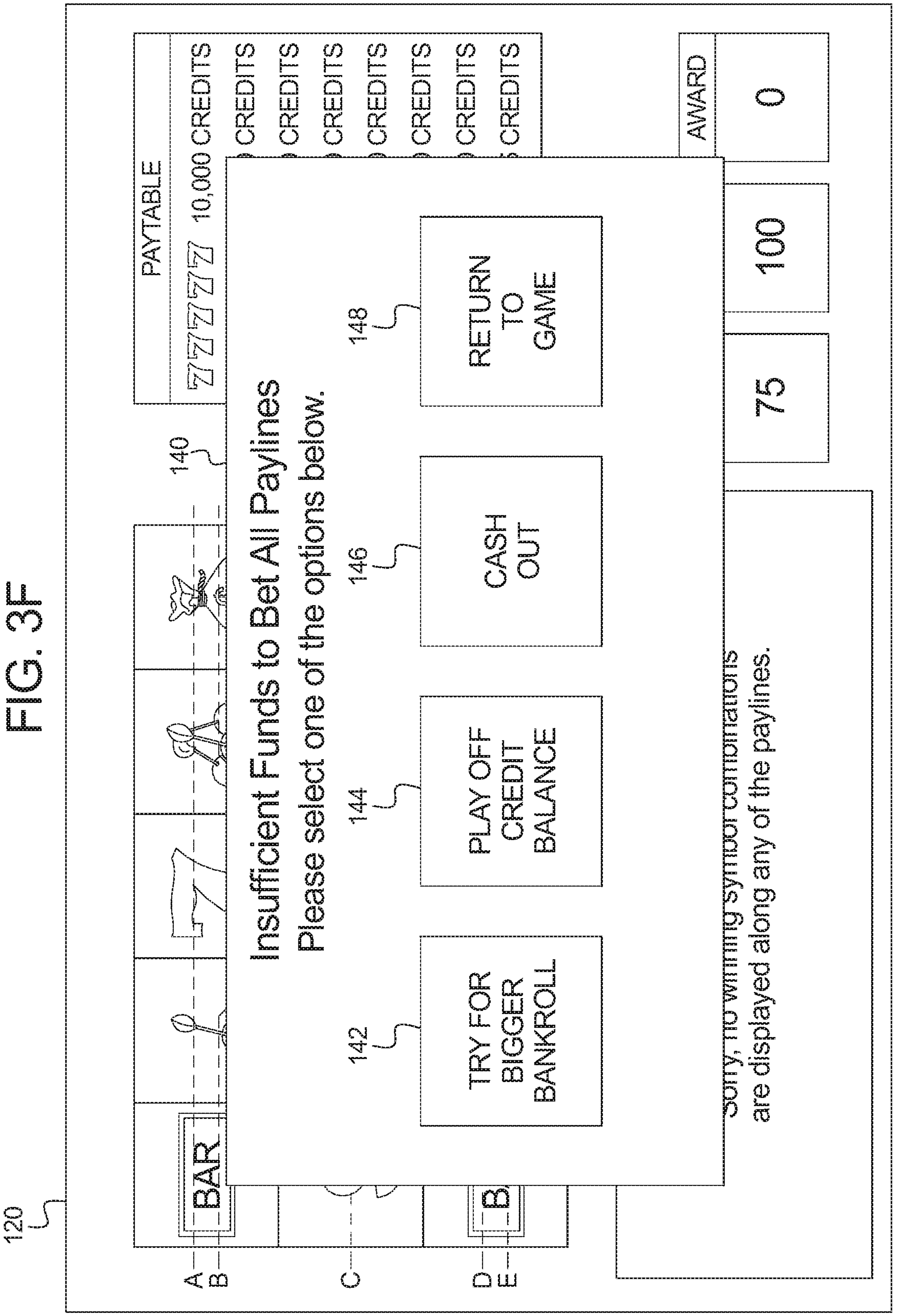

As illustrated in FIG. 3F, in this example embodiment, after the gaming system determines that the player's credit balance is less than the designated wager amount, the gaming system displays a plurality of options to the player and enables the player to select one of those options. Specifically, the gaming system displays an option selection window 140, which includes the following options: (a) a try for a bigger bankroll option 142, (b) a play off credit balance option 144, (c) a cash out option 146, and (d) a return to game option 148. The gaming system enables the player to select one of these options in any suitable manner, such as via a touch screen or a dedicated button on the gaming system.

If the player selects return to game option 148, the gaming system enables the player to continue playing the wagering as generally described above. It should be appreciated, however, that if the player does not deposit any additional value to the gaming system, the player may not wager the maximum wager amount (and, therefore, not be able to win the top award) for at least the subsequent play of the game. If the player selects cash out option 146, the gaming system cashes out the player's credits, typically by providing the player with a ticket that is redeemable by the player for currency and that has a value equal to the player's remaining credit balance at cash out. If the player selects play off credit balance option 144, the gaming system automatically places a wager (or enables the player to place a wager) having a wager amount equal to the player's remaining credit balance on a play of the wagering game. That is, if the player selects play off credit balance option 144, the gaming system places a wager having the maximum allowable wager amount based on the player's credit balance on a play of the wagering game. The play of the wagering game proceeds as described above. If the player selects try for a bigger bankroll option 142, the gaming system provides the player with a plurality of selectable alternative wager propositions.

Figure 3G:
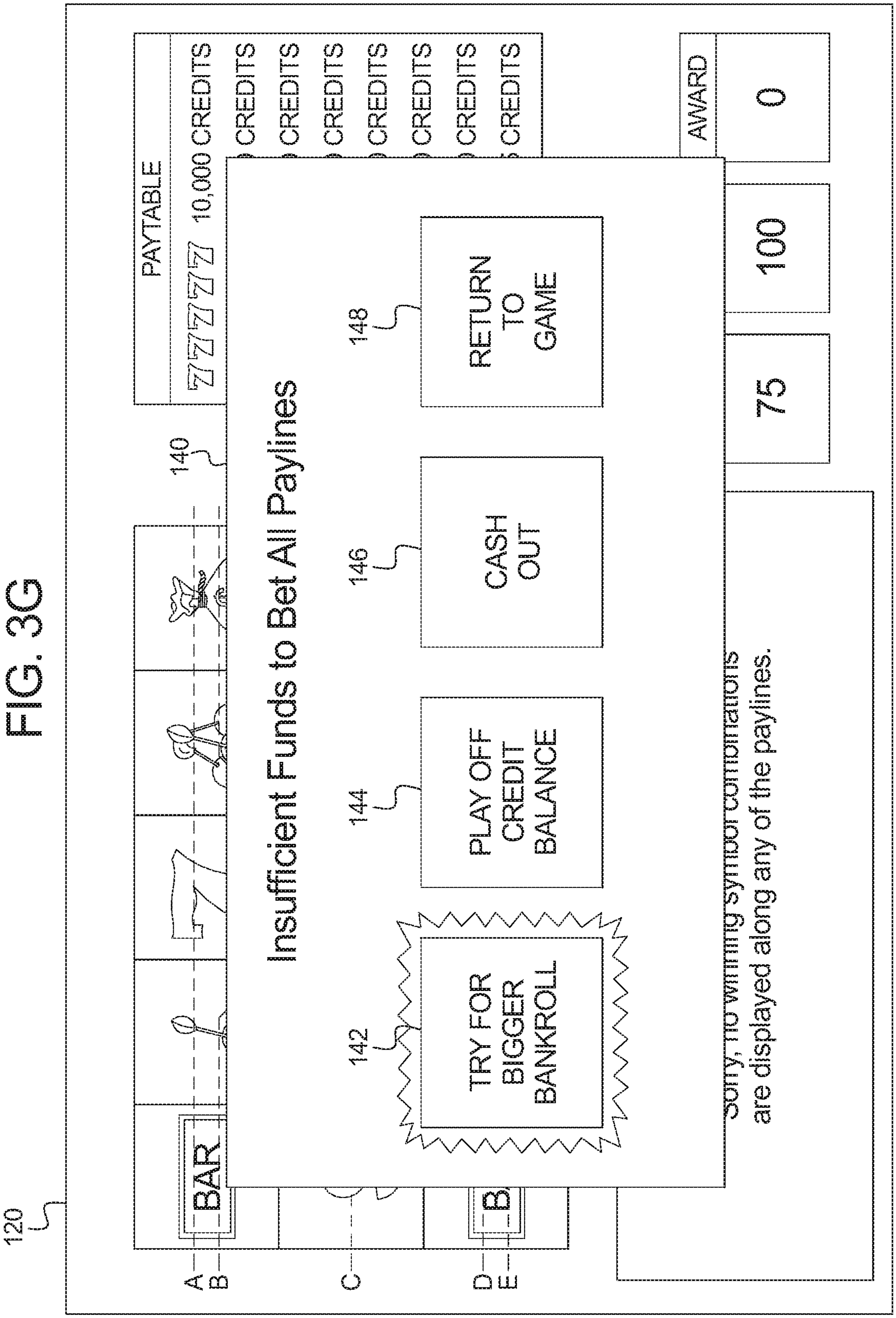

As illustrated in FIG. 3G, in this example the player selects try for a bigger bankroll option 142.

Figure 3H:
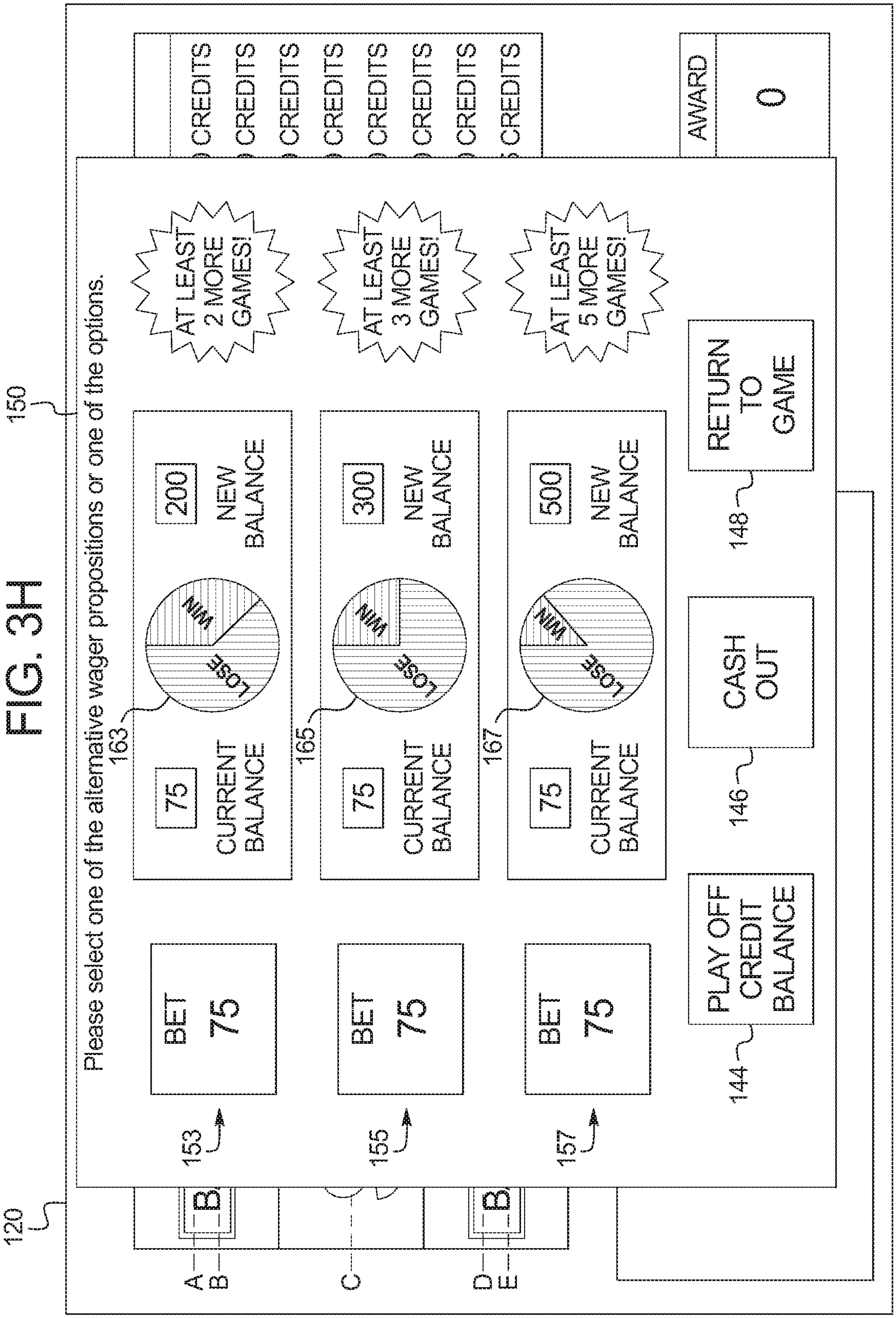

As illustrated in FIG. 3H, when the player selects try for a bigger bankroll option 142, the gaming system displays an alternative wager proposition selection window 150 including a plurality of alternative wager propositions. Specifically, alternative wager proposition selection window 150 includes a first alternative wager proposition 153, a second alternative wager proposition 155, and a third alternative wager proposition 157. Alternative wager proposition selection window also includes return to game option 148, cash out option 146, and play off credit balance option 144 which, if selected by the player instead of one of the alternative wager propositions, cause the gaming system to operate as described above.

In this example: (1) first alternative wager proposition 153 is associated with: (a) an amount risked of 75 credits, (b) a first alternative award of 200 credits, and (c) a probability of providing the first alternative award of 37.5% (i.e., the probability of the player winning the first alternative award); (2) second alternative wager proposition 155 is associated with: (a) an amount risked of 75 credits, (b) a second alternative award of 300 credits, and (c) a probability of providing the second alternative award of 25% (i.e., the probability of the player winning the second alternative award); and (3) third alternative wager proposition 157 is associated with: (a) an amount risked of 75 credits, (b) a third alternative award of 500 credits, and (c) a probability of providing the third alternative award of 12.5% (i.e., the probability of the player winning the third alternative award).

In this example, the gaming system displays the probability or an indication or representation of the probability or an indication or representation of the probability of providing the alternative award associated with each of the alternative wager options by displaying colored wheels that represent those probabilities. Specifically, 37.5% of wheel 163, which is associated with first alternative wager proposition 153, is shaded to represent the player winning the first alternative award (i.e., the gaming system providing the first alternative award), and 62.5% of wheel 163 is shaded in a different manner to represent the player not winning the first alternative award (i.e., the gaming system not providing the first alternative award). Wheels 165 and 167, which as associated with the second alternative wager proposition and the third alternative wager proposition, respectively, are shaded similarly. This enables the player to determine the probability of winning each of the first, second, and third alternative awards by viewing the wheels.

Figure 3I:
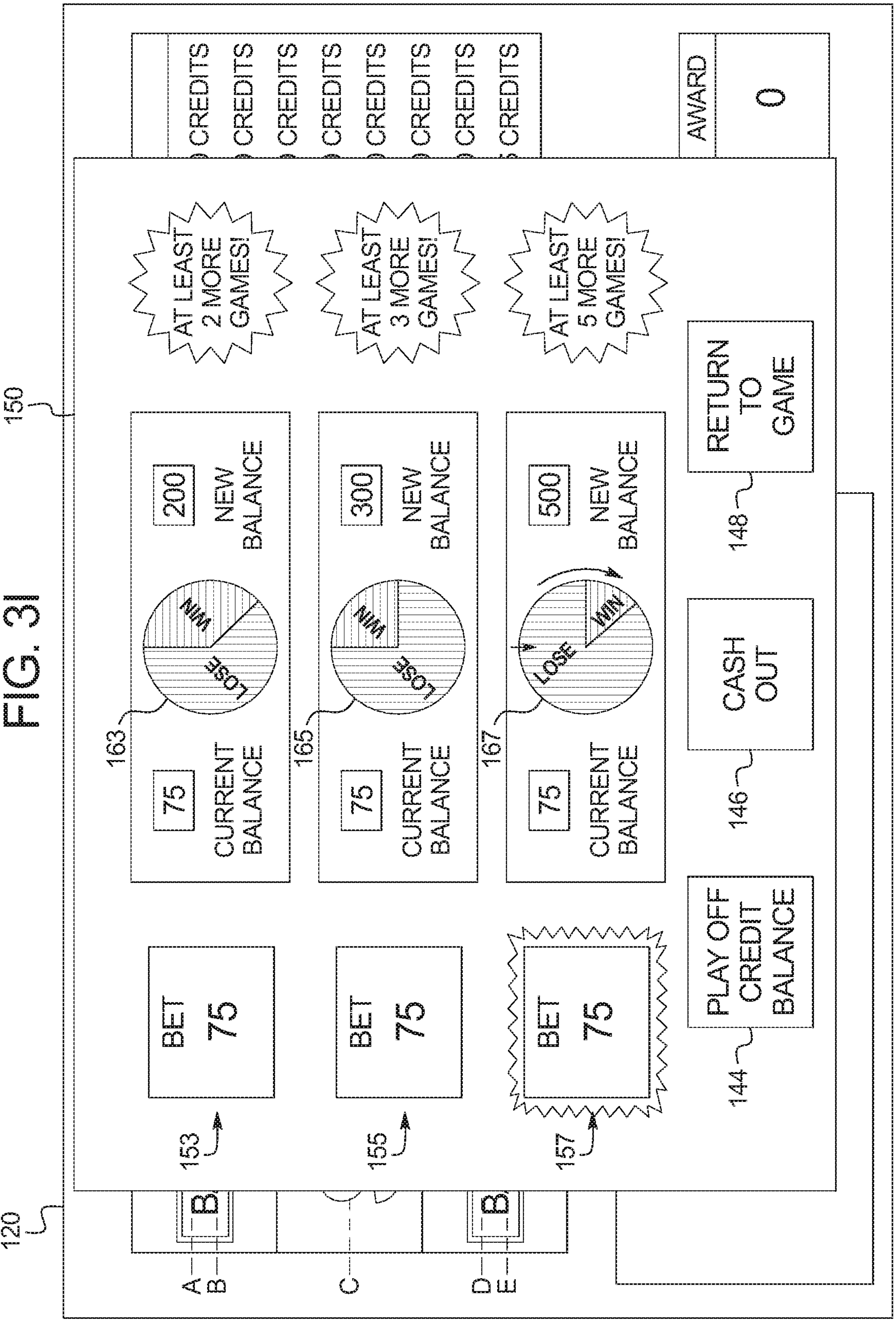
Figure 3J:
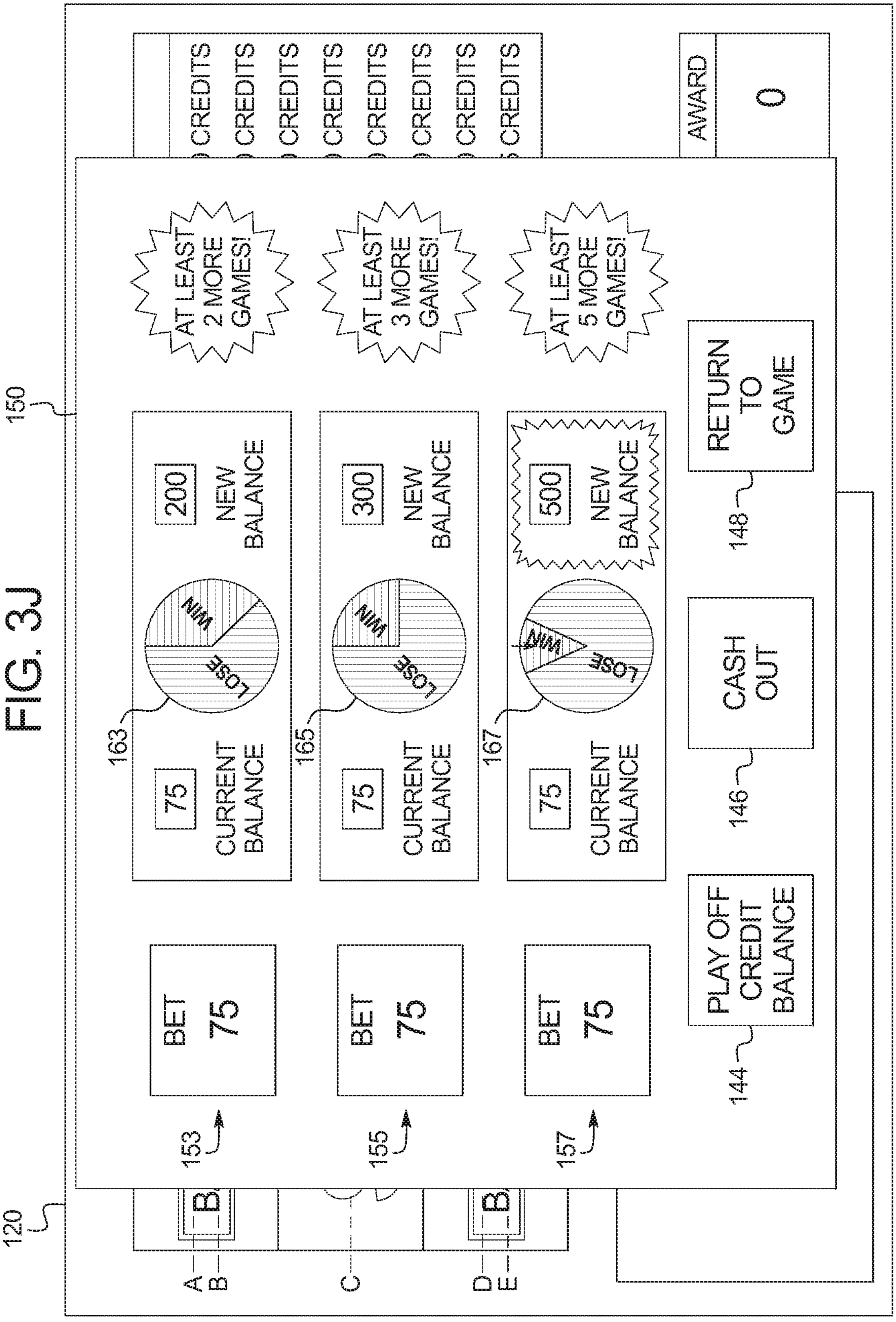
Figure 3K:
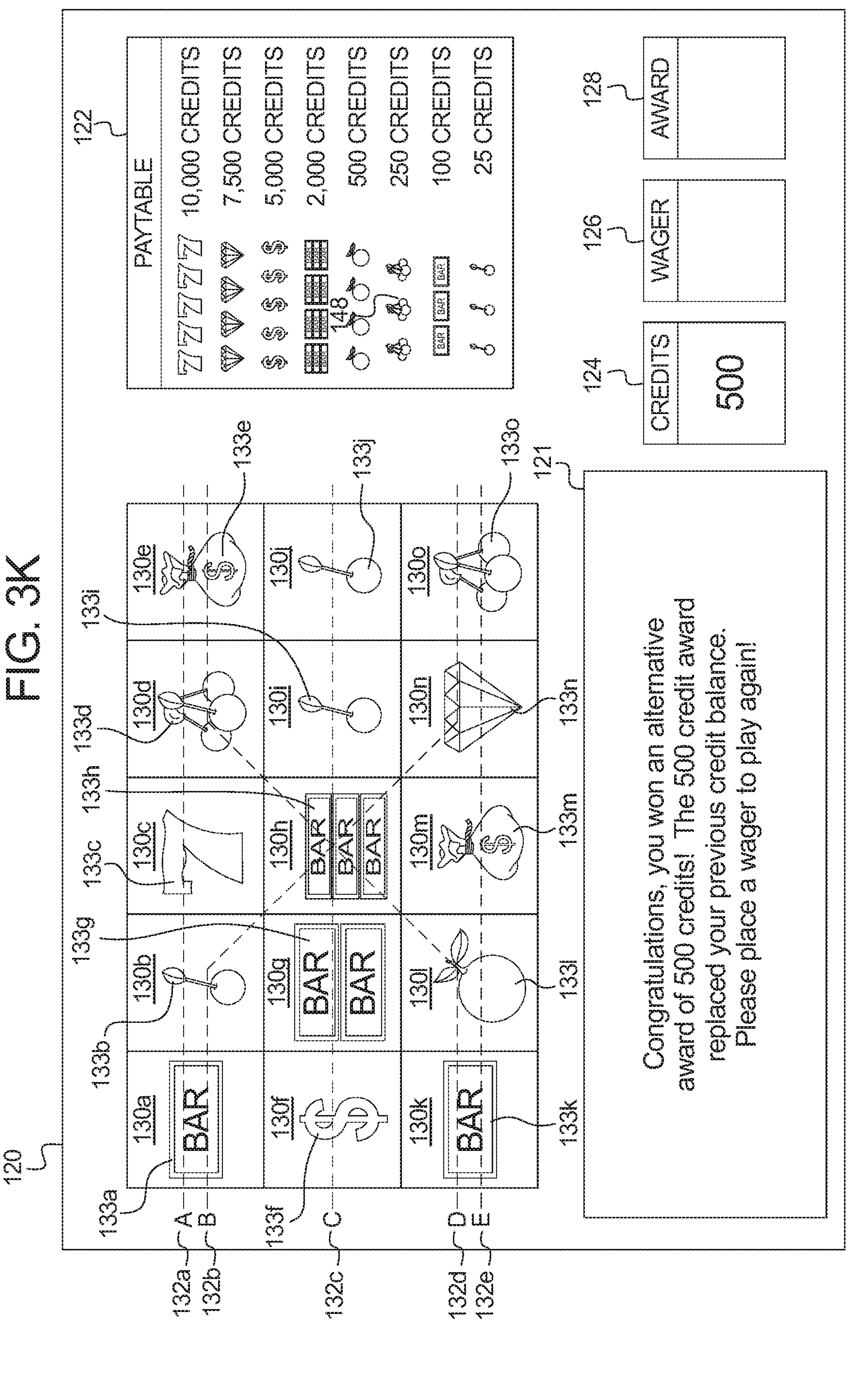

If the player accepts one of the alternative wager options, the player risks the player's remaining credit balance (i.e., the amount risked in this example), with is 75 credits in this embodiment, in an attempt to win the alternative award associated with the accepted alternative wager option. In this example, as illustrated in FIG. 3I, the player selected the third alternative wager proposition. That is, the player chose to wager the player's remaining credit balance of 75 credits for a 12.5% chance to win the third alternative award of 500 credits. The gaming system determines whether to provide the player with the third alternative award, and displays a representation of that determination by spinning wheel 167 relative to a fixed pointer. As illustrated in FIG. 3J, wheel 163 stopped and the pointer points to the section representing the player winning the third alternative award. Accordingly, as illustrated in FIG. 3K, the gaming system replaces the player's credit balance with the third alternative award of 500 credits, and prompts the player to place a wager to play the wagering game.

Figure 4:
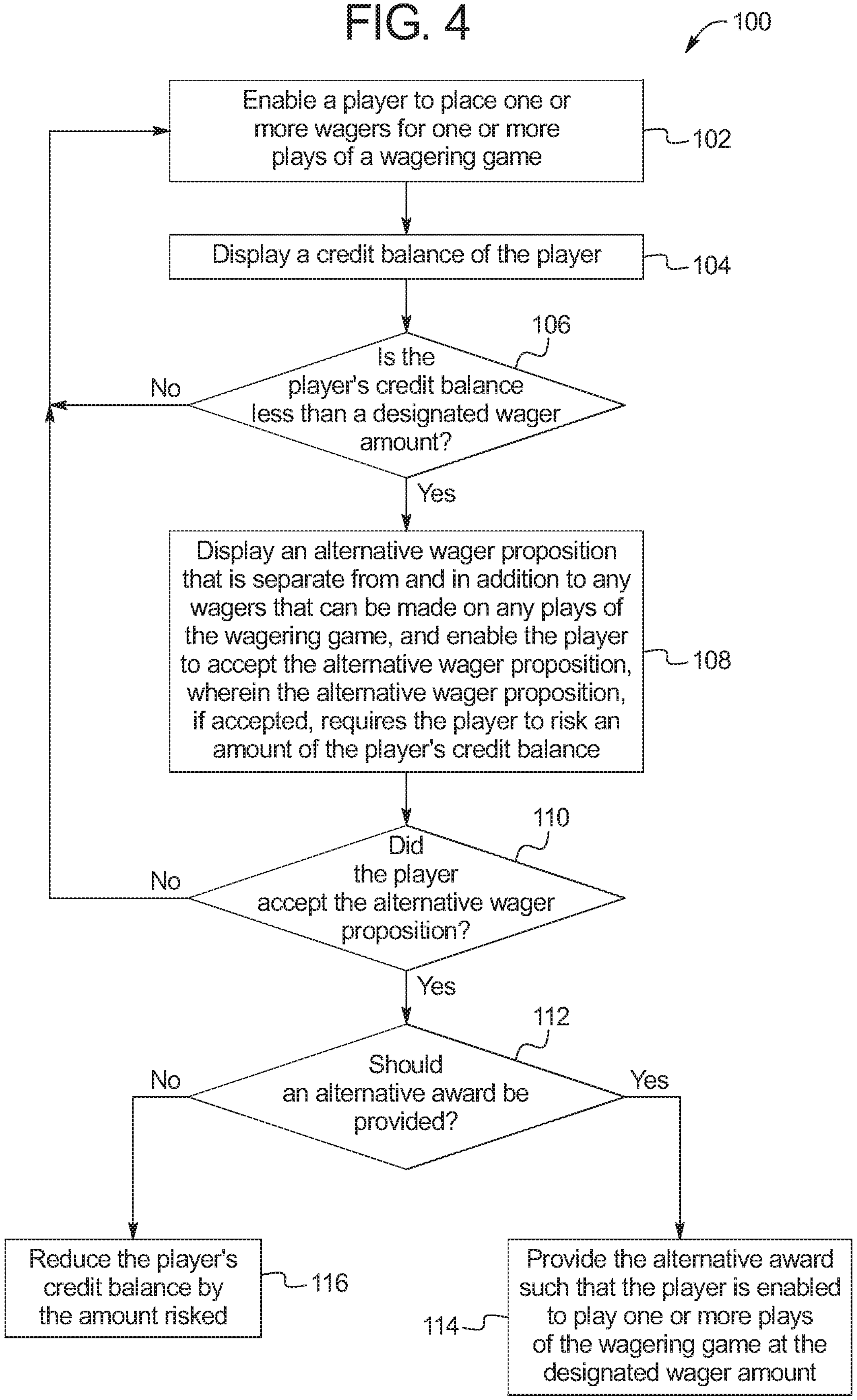
FIG. 4 is a flowchart illustrating a method of operating a one embodiment of the gaming system of the present disclosure.

FIG. 4 illustrates a flowchart of an example of a process or method 100 for operating a gaming system and gaming device of the present disclosure. In one embodiment, this process 100 is represented by a set of instructions stored in one or more memories and executed by one or more processors or controllers. Although this process 100 is described with reference to the flowchart shown in FIG. 4, it should be appreciated that many other processes of performing the acts associated with this illustrated process may be employed. For example, the order of certain of the illustrated blocks and/or diamonds may be changed, certain of the illustrated blocks and/or diamonds may be optional, and/or certain of the illustrated blocks and/or diamonds may not be employed.

In operation of one embodiment, the gaming system enables a player to place one or more wagers for one or more plays of a wagering game, as indicated by block 102. An amount of each wager placed by the player is at least a minimum wager amount and at most a maximum wager amount. The gaming system displays a credit balance of the player, as indicated by block 104. The gaming system determines if the player's credit balance is less than a designated wager amount, as indicated by diamond 106. The designated wager amount is an amount that is less than or equal to the maximum wager amount and greater than zero. If the player's credit balance is greater than or equal to the designated wager amount, process 100 returns to block 102.

If the player's credit balance is less than the designated wager amount, the gaming system displays an alternative wager proposition that is separate from and in addition to any wagers that can be made on any plays of the wagering game, and enables the player to accept the alternative wager proposition, as indicated by block 108. The alternative wager proposition, if accepted, requires the player to risk an amount of the player's credit balance. The gaming system determines whether the player accepts the alternative wager proposition, as indicated by diamond 110. If the player does not accept the alternative wager proposition, process 100 returns to block 102. If the player accepts the alternative wager proposition, the gaming system determines whether an alternative award should be provided, as indicated by diamond 112.

If the gaming system determines that the alternative award should be provided, the gaming system provides the alternative award such that the player is enabled to play one or more plays of the wagering game at the designated wager amount, as indicated by block 114. If the gaming system determines that the alternative award should not be provided, the gaming system reduces the player's credit balance by the amount risked, as indicated by block 116.

It is intended that the features of the various embodiments disclosed herein may be combined without departing from the scope of the subject matter presented.

It should further be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:

an acceptor;

a processor; and a memory device that stores instructions that, when executed by the processor, cause the processor to:

responsive to receipt of a physical item, via the acceptor, establish a credit balance based, in part, on a monetary value associated with the received physical item;

responsive to receipt of a wager input:

place a wager on a play of a wagering game, cause the credit balance to decrease based on the wager, randomly determine an outcome for the play of the wagering game, cause a display device to display the outcome for the play of the wagering game, determine any awards for the play of the wagering game, cause the display device to display any awards for the play of the wagering game, and cause the credit balance to increase based on any determined awards; and responsive to determining that an alternative wager proposition condition is satisfied:

responsive to determining that the credit balance is less than a designated wager amount necessary for another play of the wagering game, cause the display device to display an indication of a bonus game that cannot be triggered directly from any play of the wagering game;

responsive to receipt of an acceptance input accepting the bonus game and risking a part of the credit balance, displaying a play of the bonus game;

separate from any plays of the wagering game, determining, by the processor, whether to provide an alternative award based on the play of the bonus game;

responsive to determining to provide the alternative award, providing the alternative award; and responsive to determining not to provide the alternative award, causing, by processor, the credit balance to decrease based on the risked part of the credit balance based on the accepted bonus game.

2. The gaming system of claim 1, wherein the bonus game, if accepted, requires the entire credit balance to be risked.

3. The gaming system of claim 1, wherein, for each play of the wagering game, completion of that play satisfies the alternative wager proposition condition.

4. The gaming system of claim 1, wherein the alternative wager proposition condition is satisfied upon a request for a cash-out.

5. The gaming system of claim 1, wherein the alternative wager proposition condition is satisfied upon a player condition being met.

6. The gaming system of claim 1, wherein the bonus game includes a plurality of free plays of a game.

7. The gaming system of claim 1, wherein the bonus game includes a selection game.

8. The gaming system of claim 1, wherein the display device is part of a mobile device.

9. The gaming system of claim 8, wherein the wager input and the alternative wager proposition acceptance input are receivable by a touch screen of the mobile device.

* * * * *